(12) United States Patent
Fata et al.

(10) Patent No.: US 8,781,633 B2
(45) Date of Patent: Jul. 15, 2014

(54) MONITORING AND CONTROL SYSTEMS AND METHODS

(76) Inventors: Roberto Fata, New York, NY (US); Brahm Rhodes, New Rochelle, NY (US); Steve D. Bronson, Bradford, MA (US)

( * ) Notice: Subject to any disclaimer, the term of this patent is extended or adjusted under 35 U.S.C. 154(b) by 179 days.

(21) Appl. No.: 12/798,923

(22) Filed: Apr. 13, 2010

(65) Prior Publication Data

US 2010/0274366 A1    Oct. 28, 2010

Related U.S. Application Data

(60) Provisional application No. 61/212,800, filed on Apr. 15, 2009, provisional application No. 61/339,335, filed on Mar. 3, 2010.

(51) Int. Cl.
    *G06F 19/00*    (2011.01)

(52) U.S. Cl.
    USPC ........................................................ 700/276

(58) Field of Classification Search
    USPC ........ 700/1, 17, 25, 28, 275, 276, 71; 705/26, 705/37; 340/573.1, 870.17; 709/224, 230; 708/322
    See application file for complete search history.

(56) References Cited

U.S. PATENT DOCUMENTS

| | | | | |
|---|---|---|---|---|
| 5,384,994 A | | 1/1995 | Borba | 52/261 |
| 5,565,855 A | * | 10/1996 | Knibbe | 340/3.51 |
| 5,960,381 A | | 9/1999 | Singers et al. | 702/183 |
| 6,144,993 A | * | 11/2000 | Fukunaga et al. | 709/208 |
| 6,462,654 B1 | | 10/2002 | Sandelman et al. | 340/506 |
| 6,487,457 B1 | | 11/2002 | Hull et al. | 700/17 |
| 6,536,215 B1 | | 3/2003 | Vikstrom | 60/641.1 |
| 6,553,418 B1 | | 4/2003 | Collins et al. | 709/224 |
| 6,577,962 B1 | | 6/2003 | Afshari | 702/61 |
| 6,598,056 B1 | * | 7/2003 | Hull et al. | 1/1 |
| 6,601,033 B1 | | 7/2003 | Sowinski | 705/1 |
| 6,891,838 B1 | | 5/2005 | Petite et al. | 370/401 |

(Continued)

FOREIGN PATENT DOCUMENTS

| | | |
|---|---|---|
| DE | 202006012984 | 11/2006 |
| EP | 1 850 500 A1 | 10/2007 |
| WO | 00/30297 | 5/2000 |

OTHER PUBLICATIONS

Kastner et al., Communication Sytem for Building Automation and Control, Jun. 2005, IEEE, vol. 6, pp. 1178-1203.*

(Continued)

*Primary Examiner* — Kidest Bahta
(74) *Attorney, Agent, or Firm* — Mintz Levin Cohn Ferris Glovsky and Popeo, P.C.

(57) ABSTRACT

A system and a method for controlling and monitoring a system within a facility are disclosed. The system includes a facility component configured to include at least one control point configured to be disposed within a facility and to monitor and control at least one element of the system within the facility; a network component configured to be communicatively coupled to the facility component and configured to process information received from the at least one control point; a remote client component configured to be communicatively coupled to the network component and configured to provide monitoring and control of the facility via the network component and the facility component. The remote client component is configured to receive processed data from the network component and generate instructions to the control point via the network component.

17 Claims, 35 Drawing Sheets

(56) References Cited

U.S. PATENT DOCUMENTS

| | | | |
|---|---|---|---|
| 6,904,336 B2 | 6/2005 | Raines et al. | 700/286 |
| 6,917,288 B2* | 7/2005 | Kimmel et al. | 340/511 |
| 6,922,558 B2 | 7/2005 | Delp et al. | 455/420 |
| 7,032,018 B2 | 4/2006 | Lee et al. | 709/223 |
| 7,049,951 B2 | 5/2006 | Rhodes et al. | 340/500 |
| 7,092,898 B1 | 8/2006 | Mattick et al. | 705/26 |
| 7,103,511 B2 | 9/2006 | Petite | 702/188 |
| H2176 H | 12/2006 | Meyer et al. | 236/51 |
| 7,164,972 B2* | 1/2007 | Imhof et al. | 700/276 |
| 7,183,899 B2* | 2/2007 | Behnke | 340/286.01 |
| 7,218,708 B2 | 5/2007 | Berezowski et al. | 379/37 |
| 7,227,450 B2 | 6/2007 | Garvy et al. | 340/286.05 |
| 7,249,146 B2 | 7/2007 | Brecher | 707/104.1 |
| 7,337,191 B2 | 2/2008 | Haeberle et al. | 707/104.1 |
| 7,340,312 B2* | 3/2008 | Strole | 700/25 |
| 7,341,193 B2 | 3/2008 | Iasso et al. | 235/472.01 |
| 7,353,070 B2 | 4/2008 | Landou et al. | 700/19 |
| 7,382,271 B2 | 6/2008 | McFarland | 340/686.6 |
| 7,383,148 B2 | 6/2008 | Ahmed | 702/127 |
| 7,719,440 B2* | 5/2010 | Delp et al. | 340/870.02 |
| 7,965,174 B2* | 6/2011 | Wong et al. | 340/286.02 |
| 2001/0048376 A1* | 12/2001 | Maeda et al. | 340/870.17 |
| 2002/0035535 A1 | 3/2002 | Brock, Sr. | 705/37 |
| 2002/0144537 A1 | 10/2002 | Sharp et al. | 73/31.01 |
| 2003/0078677 A1 | 4/2003 | Hull et al. | 700/1 |
| 2004/0008651 A1* | 1/2004 | Ahmed | 370/338 |
| 2004/0024483 A1 | 2/2004 | Holcombe | 700/122 |
| 2004/0095237 A1* | 5/2004 | Chen et al. | 340/506 |
| 2004/0143474 A1 | 7/2004 | Haeberie et al. | 705/8 |
| 2004/0143510 A1 | 7/2004 | Haeberie et al. | 705/26 |
| 2004/0148288 A1 | 7/2004 | Haeberie et al. | 707/10 |
| 2005/0038571 A1 | 2/2005 | Brickfield et al. | 700/295 |
| 2005/0043862 A1 | 2/2005 | Brickfield et al. | 700/295 |
| 2005/0137921 A1 | 6/2005 | Shahriari | 705/7 |
| 2005/0154494 A1 | 7/2005 | Ahmed | 700/275 |
| 2005/0182498 A1 | 8/2005 | Landou et al. | 700/20 |
| 2005/0233295 A1 | 10/2005 | Chiszar et al. | 434/350 |
| 2006/0010388 A1 | 1/2006 | Imbof et al. | 715/734 |
| 2006/0181406 A1* | 8/2006 | Petite et al. | 340/521 |
| 2006/0220827 A1 | 10/2006 | Rhodes et al. | 340/500 |
| 2007/0033087 A1 | 2/2007 | Combs et al. | 705/8 |
| 2007/0055760 A1* | 3/2007 | McCoy et al. | 709/223 |
| 2007/0061046 A1* | 3/2007 | Mairs et al. | 700/275 |
| 2007/0204800 A1 | 9/2007 | O'Neil | 119/428 |
| 2007/0235550 A1 | 10/2007 | Donath et al. | 237/1 |
| 2007/0242688 A1 | 10/2007 | McFarland | 370/445 |
| 2007/0244573 A1 | 10/2007 | McFarland | 700/20 |
| 2007/0255461 A1 | 11/2007 | Brickfield et al. | 700/295 |
| 2008/0015823 A1 | 1/2008 | Arnold et al. | 703/1 |
| 2008/0177423 A1 | 7/2008 | Brickfield et al. | 700/291 |
| 2008/0183317 A1 | 7/2008 | Kim et al. | 700/90 |
| 2008/0195405 A1 | 8/2008 | Lopez et al. | 705/1 |
| 2008/0205427 A1 | 8/2008 | Jost et al. | 370/431 |

OTHER PUBLICATIONS

Olken et al., Remate Buliding Monitoring and control, May 1996, Lawrence Berkeley Natioanl Labratory, pp. 1-13.*

International Search Report and Written Opinion from PCT/US2010/030882 dated Aug. 12, 2010.

"Green Building Solutions—Driving High-Performance Building for a Sustainable Future," Siemens Building Technologies, Inc., www.usa.siemens.com, Oct. 2007, Part# 153-731 p. 10.

"About Green Building—Green Building Solutions," Siemens Building Technologies, Inc., http://www.buildingtechnologies.usa.siemens.com, Jun. 4, 2008.

"LEED Rating Systems—What is LEED®?," About USGBC—Policies & Guidelines, U.S. Green Building Council, 2008.

"WebPTRL—Seamless Communications Between Systems," Automated Logic Corp., www.automatedlogic.com, Copyright 2007.

"Innovative Building Controls Solutions Made Powerfully Simple—Host Software, WebPRTL," Automated Logic Corporation, www.automatedlogic.com, Copyright 2008.

"ITEC Hanshin Selects SL Corporation's Real-Time Java GUI for Web-based Building Facility Management System, OCTBAS-i," www.sl.com, Sherrill-Lubinski Corporation, 1999-2008.

"Innovative Building Controls Solutions Made Powerfully Simple—ALC System Architecture," Automated Logic Corporation, www.automatedlogic.com, Copyright 2008.

"Clever Minds Choose Clever Solutions: Total Building Solutions," Siemens Building Technologies AG, www.sbt.siemens.com.

"Metasys Building Automation Systems—Metasys®" Johnson Controls, Inc., www.johnsoncontrols.com.

"Siemens—Products & Systems," Siemens Building Technologies, Inc., http://www.buildingtechnologies.usa.siemens.com, Jul. 14, 2008.

"Siemens—TALON Control System—Building Automation and Control," Siemens Building Technologies, Inc., http://www.buildingtechnologies.usa.siemens.com, Jul. 14, 2008.

"Siemens—The Siemens answer: Total Building Solutions," Siemens Building Technologies, Inc., www.siemens.com/tbs.

* cited by examiner

Client Interface — Login

FIG. 3

Client Interface — Add/Edit User

FIG. 4

Client Interface —Facility Management (main)

Client Interface – Client Homepage (top)

FIG. 6

Client Interface – Client Homepage (top)

FIG. 7

| | Overview | Facilities | Contacts | Profile | Billing | Support |
|---|---|---|---|---|---|---|

Building System Control; Facility 1

| Views | Facility/Bldg ID | Control Point | Value | Status | Source |
|---|---|---|---|---|---|
| by building | F1/B1 | FL1 Rm 15 Lights | on | norm | Web |
| by system | F1/B1 | FL2 Rm 25 Lights | on | norm | Web |
| by event | F1/B1 | FL3 Zone A HVAC | 68°F | norm | Logic |
| | F1/B1 | FL4 Rm 410 Lights | on | norm | Mobile |
| | F1/B2 | FL2 Rm 211 Lights | off | norm | Local |
| | F1/B3 | Lobby Door | open x | Alarm | Alarm |

Client Interface — Building/System View

FIG. 8

BUSINESS PROFILE

[Generate New Customer ID]   Customer ID [        ]

Business Name [        ]
Business Address [        ]
Business Phone [        ]
Email [        ]

Technical Contact

Name [        ]
Address [        ]
Phone [        ]
Email [        ]

Billing Contact

Name [        ]
Address [        ]
Phone [        ]
Email [        ]

[Update Business Profile]   [View/Edit/Setup Facilities]

Interface — Business Profile

FIG. 9

FACILITIES

Select Facility
- Facility 1
- Facility 2
- Facility 3
- Facility 4
- Facility 5

[Add Facility]

Current Facility
Facility Description

Router IP Address
Subnet IP Address

Device Instance
BACnet Port

Authentication Types
Username
Password

[Advanced]

Select Communication Protocol
- Lon Talk
- BACnet
- MODbus
- Other/Custom
- General

[Test Communication]
[Save / Update Facility]
[Edit Facility Device List]

Interface – Facilities Setup

*FIG. 10*

FACILITIY NODES

Query Nodes
- Node 1
- Node 2
- Node 3
- Node 4
- Node 5

[Add Node]

Communication Protocol
- Lon Talk
- BACnet
- MODbus
- Other/Custom

Current Node: _____
Node Description: _____

Subnet IP Address: _____    Port: ___
Authentication Types: _____
Username: _____
Password: _____

[Test Node Communication]
[Save / Update Node]

[Enter Node Device Setup]

Interface – Facilities Setup: Nodes

NODE OBJECTS

Node Objects
- Object 1
- Object 2
- Object 3
- Object 4
- Object 5

| Field | Value | |
|---|---|---|
| Current Object | _____ | [Child Setup] |
| Object Type | _____ | |
| Object Description | _____ | [Extended Properties] |
| Object Property | _____ | |
| Typ(Control/Sensor) | _____ | [Advanced Options] |
| Monitor | Yes/No | [Advanced Options] |
| Polling Frequency | _____ | [Advanced Options] |
| Alert | Yes/No | [Advanced Options] |
| Alert Type | Priority 1,2,3 | |

[Save / Update Object Settings]

Interface – Facilities Setup: Node Parameters

FIG. 12

| | | | | | | Hello Username Logout |
|---|---|---|---|---|---|---|
| Add a client | Clients | Reports | Billing | | | |
| | | | | | | Search |
| | | | | | | Advanced Search |

⊞ Building in Inc.    Create new site [Add a Building] [Edit]

MORE DETAILS ⊕

⊟ Site Name

| NAME▽ | STATUS | ADDRESS | CONTACT | ZONES | FLOORS | |
|---|---|---|---|---|---|---|
| 350 Broadway | ● Active | 350 Broadway, New York NY 10015 | John Smith | 15 | 8 | Edit |
| 173 W Broadway | ● Active | 73 W Broadway, New York NY 1001 | David Grossman | 6 | 21 | Edit |
| 200 E 62nd | ○ Inactive | 200 E 62nd, New York NY 10065 | Rachel Warner | 200 | 14 | Edit |

⊞ Site Name

⊞ R.E.X.    Create new site [Add a Building] [Edit]

MORE DETAILS ⊕

3 SITES    12 Buildings

⊞ Carrara Buildings    Create new site [Add a Building] [Edit]

MORE DETAILS ⊕

3 SITES    12 Buildings

*FIG. 18*

| Clients | Reports | Billing |

Clients•Client Name◉•Sites

Hello Username  Logout

Client Name
main.email@zmail.com  ID client_name                    [Edit]

| Sites | Systems | Users | Contact | User Roles |

[Create a new Site] [Add a Building]

All Sites

⊟ Site Name
　350 Broadway
　173 W Broadway
　200 E 62nd
　260 W 21st ST.
　250-256 W 17th St.
　Radley Tower
⊟ Site Name (10)
⊟ Site Name
　350 Broadway
　173 W Broadway
　200 E 62nd
　260 W 21st ST.
　250-256 W 17th St.
　Radley Tower

OVERVIEW

| 3 SITES | 28 BUILDINGS | 18 ZONES |

STATUS:
3 WARNINGS

Light System
Blablah System
Air System
Something else

4 SYSTEMS

Light System
Blablah System
Air System
Something else

4 CONTROL PANEL TYPES

Light System
Blablah System
Air System
Something else

Hello Username  Logout

Clients | Reports  Billing

Clients•Client Name▼•Users

Client Name
main.email@zmail.com ID client_name    [Edit]

Sites | Systems | Users | Billing Contact  Technical Contact

[Add User]                                                    [Search]
                                                        Advanced Search

| NAME▼ | ACCESS | BUILDINGS | CELL | EMAIL | |
|---|---|---|---|---|---|
| John Smith | ⟨ | 350 Broadway, 260 W 21st ST, Show all | | | Edit |
| David Grossman | ⟪ | 173 Broadway | | | Edit |
| Rachel Warner | ⟪ administrator | 62nd | | | Edit |
| Nevel Froman | ⟨ | 260 W 21st ST | | | Edit |
| Tim Robbs | ⟨ | 350 Broadway, 260 W 21st ST, Show all | | | Edit |
| David Patrick White | ⟨ | Radley Tower | | | Edit |
| John Smith | ⟪ | 350 Broadway | | | |
| David Grossman | ⟨ | 350 Broadway<br>260 W 21st ST<br>350 Broadway<br>260 W 21st ST<br>show less | | | |
| Rachel Warner | ⟪ | 200 E 62nd | | | Edit |
| Nevel Froman | ⟪ | 260 W 21st ST | | | Edit |

Clients | Reports | Billing    Hello Username Logout

Clients•Client Name•Users•David Grossman

Mr. David Grossman                 ⋘ ADMINISTRATOR    [Edit]
                                       ACTIVE

| Details | Permissions | Alerts |

CONTACT
e-mail
IM, david q.
☐ work
☐ cell

ADDRESS
173 W Broadway
New York, NY
10013

3 SITES    12 BUILDINGS

| ⊟ Site Name | |
|---|---|
| 350 Broadway | • ACTIVE |
| 173 W Broadway | • ACTIVE |
| 200 E 62nd | ○ INACTIVE |
| 260 W 21st ST. | • ACTIVE |
| 250-256 W 17th St. | • ACTIVE |
| Radley Tower | ○ INACTIVE |

| ⊞ Site Name | |
|---|---|
| 350 Broadway | ⊘ ALARM |
| 173 W Broadway | • ACTIVE |
| 200 E 62nd | ⊘ WARNING |
| 260 W 21st ST. | NO ICON |

```
Clients   Reports   Billing                          Hello Username Logout

Clients•Client Name•Users•David Grossman•Alerts

Mr. David Grossman                              ⋚ADMINISTRATOR    [Edit]
[_____]                                   ACTIVE

[Details|Permissions|Alerts]

SEND TO                      SET ALL ON    SET ALL OFF

Iphone:     [_____]                ON ⊂◯

Blackberry: [_____]                OFF⊂◯

Email:      [_____]                OFF⊂◯

[Add New Destination]
```

*FIG. 25*

Hello Username Logout

Clients    Reports    [Billing]

[Create new billing]    FROM: [          ]    TO: [          ]    [Search]

| INV DATE ▼ | INV # | CLIENT | SITE | BUILDING | PERIOD | VARIABLE # | TOTALS |
|---|---|---|---|---|---|---|---|
| 2009-FEB-10 | 55327 | Build-In Inc. | Site Name | 350 Broadway | monthly | monthly | 55327 |
| 2009-FEB-10 | 984 | 173 W Broadway | Complex B | 173 W Broadway | weekly | weekly | 984 |
| 2009-FEB-10 | 3432 | 200 E 62nd | Okebon | 200 E 62nd | weekly | weekly | 3432 |
| 2009-MAR-10 | 78912 | 260 W 21ST ST | Guiat | 260 W 21st ST | last 2 weeks | last 2 weeks | 78912 |
| 2009-MAR-10 | 1456 | 350 Broadway | Okebon | 350 Broadway | monthly | monthly | 1456 |
| 2009-MAR-15 | 359 | Radley Tower | Guiat | Radley Tower | monthly | monthly | 359 |
| 2009-APR-18 | 22 | 350 Broadway | Targus | 350 Broadway | weekly | weekly | 22 |
| 2009-APR-18 | 40308 | 350 Broadway | Targus | 350 Broadway | weekly | weekly | 40308 |
| 2009-MAY-10 | 33529 | 200 E 62nd | Complex B | 200 E 62nd | monthly | monthly | 33529 |
| 2009-MAR-12 | 227 | 260 W 21ST ST | Wincofon | 260 W 21ST ST | last 2 weeks | last 2 weeks | 227 |
| 2009-MAY-15 | 9653 | 250-256 W 17th ST | CCGSM | 250-256 W 17th st | monthly | monthly | 9653 |
| 2009-JUN-15 | 28456 | Radley Tower | CCGSM | Radley Tower | monthly | monthly | 28456 |

Reports

Clients | Reports | Billing

Hello Username Logout

① Clients, Sites and Buildings 〉 ② Choose Report 〉 ③ Browse Report

Help

Selected Items

Site Name
☒ 350 Broadway
   173 W Broadway
   200 E 62nd
   260 W 21st ST.

Site Name
   350 Broadway
   173 W Broadway

Refine Report

Zones
☐ Global
☑ Basement
☐ First Floor
☑ Second Floor
☑ Administrative

System
☐ Global
☑ Basement
☐ First Floor

Groups
☐ Global
☐ Environment
☑ Security
☐ Saftey
☑ Access

SUMMARY REPORTS

⌘ Temperature
⌘ Alerts & Detections
↻ Access

CONTROL REPORTS you cant do control reports for multiple buildings please select just one to do a control report

[ ▼ ]

CONTROL REPORTS    ☐ HIDE INTERACTIVE

For 350 Broadway-Site name chopped ▶

Quickfind a Control

⌘ Temperature Monitor (x1)
⌘ Temperature Monitor (x2)
⌘ Temperature Monitor (x3)
ZONE: Second Floor
SYSTEM: Global
∴ Temperature Monitor (x6)
⌘ Temperature Monitor (x7)
∴ Temperature Monitor (x8)
⌘ Temperature Monitor (x9)
↻ Temper Switch Panel 1 (x10)
↻ Temperature Monitor (x11)
↻ Temper Switch Panel 2 (x12)
↻ Water Panel 1 Area (x13)
↻ Water Panel 2 Area (x14)

Page 1 of 5 [ Next ]

Clients Name • Buildings

Dashboard | Buildings | User scheduling Settings

Hello Username Logout

[Search]
Advanced Search

⊟ Site Name

| NAME ▼ | STATUS | ADDRESS | CONTACT | ZONES | SIZE | |
|---|---|---|---|---|---|---|
| 350 Broadway | ○ ACTIVE | 350 Broadway, New York, NY 10015 | John Smith | 15 | 50,000 sqft | [Edit] |
| 173 W Broadway | ○ ACTIVE | 350 Broadway, New York, NY 10015 | David Grossman | 6 | 21,000 sqft | [Edit] |
| 200 E 62nd | ● INACTIVE | 200 E 62nd, New York, NY 10065 | Rachel Warner | 200 | 250000 sqft | [Edit] |
| 260 W 21st | ○ ACTIVE | 260 W 21st st ST | Neuel Froman | 6 | 3,000 sqft | [Edit] |
| 250-266 W 17th st | ○ OFF | 250-266 W 17th st | Tim Robbs | 15 | 50,000 sqft | [Edit] |
| Radley Tower | ⊙ DATA | 459 Bowery, New York, NY 11000 | David Patrick White | 6 | 21,000 sqft | [Edit] |

⊟ Site Name

[Edit]

⊟ Site Name

| NAME ▼ | STATUS | ADDRESS | CONTACT | ZONES | SIZE | |
|---|---|---|---|---|---|---|
| 350 Broadway | ⊘ ALERT | 350 Broadway, New York, NY 10015 | John Smith | 15 | 50,000 sqft | [Edit] |
| 173 W Broadway | ○ ACTIVE | 173 Broadway, New York, NY 1001 | David Grossman | 6 | 21,000 sqft | [Edit] |
| 200 E 62nd | ● WARNING | 200 E 62nd, New York, NY 10065 | Rachel Warner | 200 | 250000 sqft | [Edit] |
| 260 W 21st ST | NO ICON | 260 W 21st st ST | Neuel Froman | 6 | 3,000 sqft | [Edit] |

FIG. 32

| | |
|---|---|
| Dashboard [Buildings] User Scheduling Settings | Hello Username Logout [3] |

Clients Name • Site name •174 W Broadway•Details

173 W Broadway
Site Name

[Edit]

| Details | Zones | Users |
|---|---|---|

| ADDRESS | ZONES | SIZE | PUBLIC IP ADDRESS |
|---|---|---|---|
| 173 W Broadway<br>New York, NY<br>10013 | 6 | 23 Floors | [      ] |

CONTROL PANEL TYPE     AVAILABLE PORTS FOR DIMI APP
A control panel type name     8080. 8181. 9090. 1010

CONTACT                                              GATEWAY
David Grossman                                    [      ]

DNS
Send alert                                          Name:ns1.elserver.com
                                                                IP [      ]

LAN IP FOR CONTROL PANEL
                                                                [      ]

LAN IPS FOR DIMI EQUIPMENT
                                                                [      ]

*FIG. 33*

Client Name • Users                     Dashboard  Buildings  [Users]  Scheduling  Settings     Hello Username  Logout  [3]

[Add User]                                                                        [    Search    ]  [Search]
                                                                                         Advanced Search

| NAME▼ | ACCESS | BUILDINGS | CELL | EMAIL | |
|---|---|---|---|---|---|
| John Smith | « | 350 Broadway, 260 W 21st ST, Show all | | | [Edit] |
| David Grossman | « | 173 W Broadway | | | [Edit] |
| Rachel Warner | «[administrator] | 62nd | | | [Edit] |
| Nevel Froman | « | 260 W 21st ST | | | [Edit] |
| Tim Robbs | « | 350 Broadway, 260 W 21st ST, Show all | | | [Edit] |
| David Patrick White | « | Radley Tower | | | [Edit] |
| John Smith | « | 350 Broadway | | | [Edit] |
| David Grossman | « | 350 Broadway<br>260 W 21st ST<br>350 Broadway<br>260 W 21st ST<br>show less | | | |
| Rachel Warner | « | 200 E 62nd | | | [Edit] |
| Nevel Froman | «« | 260 W 21st ST | | | [Edit] |
| Tim Robbs | « | 250-266 W 17th st | | | [Edit] |
| David Patrick White | « | Radley Tower | | | [Edit] |

*FIG. 34*

| Dashboard Buildings | Users | Scheduling Settings | Hello Username Logout |

Clients Name • Users•David Grossman•Details

Mr. David Grossman      ⋘ ADMINISTRATOR ACTIVE    [Edit]

| Details | Permissions | Alerts |

CONTACT e-mail
IM
☐ work
☐ cell

ADDRESS
173 Broadway
New York, NY
10013

3 SITES   12 BUILDINGS

| ⊟ Site Name | |
|---|---|
| 350 Broadway | ● ACTIVE |
| 173 W Broadway | ● ACTIVE |
| 200 E 62nd | ○ INACTIVE |
| 260 W 21st ST. | ● ACTIVE |
| 250-256 W 17th St. | ● ACTIVE |
| Radley Tower | ○ INACTIVE |

| ⊟ Site Name | |
|---|---|
| 350 Broadway | ● ACTIVE |
| 173 W Broadway | ● ACTIVE |
| 200 E 62nd | ○ WARNING |

| Dashboard Control System | Alerts | Settings | Hello Username Logout [4] |
|---|---|---|---|
| Alerts | FROM [ ] TO: [ ] | | SYSTEM Control or Building name (Search) |
| Low Temperature in basement (MARK AS READ) | | at 173 W Broadway | 20 minutes ago |
| High temperature in third floor (MARK AS READ) | | at 173 W Broadway | 3 hours ago |
| Warning Saftey Relay low (MARK AS READ) | | at 200 E 62nd | yesterday |
| Valve Stat high | | at 260 W 21st ST | 2010-10-20 |
| Basement Lights off | | at 350 Broadway | 2010-10-20 |
| Water Level low | | at Radley Tower | 2010-10-19 |
| High Temperature in elevator | | at 350 Broadway | 2010-10-18 |

MONITORING AND CONTROL SYSTEMS AND METHODS

CROSS-REFERENCE TO RELATED APPLICATIONS

The present application claims priority to U.S. Provisional Patent Application No. 61/212,800 to Fata et al., filed Apr. 15, 2009, and entitled "Building Management System", and U.S. Provisional Patent Application No. 61/339,335 to Fata, filed Mar. 3, 2010, and entitled "Monitoring and Control Systems and Methods," incorporates the disclosure of the above-referenced applications herein by reference in their entireties.

BACKGROUND OF THE PRESENT INVENTION

1. Field of the Invention

The present invention relates to communications systems and methods for monitoring and/or controlling a multitude of functionalities within various facilities and/or buildings. More particularly, the present invention relates to communications systems and methods for remotely monitoring and/or controlling a plurality of building functions relating to various utility, security, maintenance, etc. systems within a single building and/or a plurality of buildings. Even more particularly, the present invention relates to communication systems and methods for remotely monitoring and controlling various functionalities, including sensors, alarms, and/or other devices within a facility and/or a plurality of facilities In some embodiments, the present invention relates to systems and methods that can be configured to enable remote management of building systems and sub-systems, such as HVAC, boilers, lighting, electrical systems, security systems, and any other types of systems in a building and/or buildings. The present invention can be further configured to provide a monitoring and command interface to any building system that, in some embodiments, can be configured to use LonTalk and/or Bacnet protocols or any other protocols for communication.

2. Background

Today's buildings, whether residential, commercial, medical, or otherwise, are sustained through operation of various utility systems. Through operation of such systems electricity, heat, HVAC, water, lighting, security and other necessities are typically provided to the buildings. Each system may include various electrical, mechanical, and human components that ensure proper operation of such system. Some conventional system are controlled by human operators and thus, require maintenance of staff on-site or on-call to control, maintain, and otherwise operate the systems. Others may be controlled automatically or through a combination of automatic and human control. Such systems force building owners to extend additional resources and costs in order to maintain proper operation of these systems as well as account for any human errors that may result in improper operation of the systems. This may be costly as one overlooked system malfunction can lead to a whole host of problems that will need to be fixed.

Further, many conventional systems are not capable of remotely controlling multiple buildings having multiple building functionalities using a single monitor-and-control device and be adaptable to various control interfaces that are used by the buildings and building owners.

Thus, there is a need to provide a system and a method for monitoring and controlling various functionalities within a facility/building and/or facilities/buildings using a single monitor-and-control device, where such monitoring and control functions are configured to be adaptable to various system and/or building environments.

SUMMARY OF THE INVENTION

In some embodiments, the present invention relates to a system for controlling and monitoring a system within a facility. The system includes a facility component configured to include at least one control point configured to be disposed within a facility and to monitor and control at least one element of the system within the facility; a network component configured to be communicatively coupled to the facility component and configured to process information received from the at least one control point; a remote client component configured to be communicatively coupled to the network component and configured to provide monitoring and control of the facility via the network component and the facility component. The remote client component is configured to receive processed data from the network component and generate instructions to the control point via the network component.

In some embodiments, the present invention relates to a method for controlling and monitoring a system within a facility using a communications system having a facility component configured to include at least one control point configured to be disposed within a facility and to monitor and control at least one element of the system within the facility; a network component configured to be communicatively coupled to the facility component and configured to process information received from the at least one control point; a remote client component configured to be communicatively coupled to the network component and configured to provide monitoring and control of the facility via the network component and the facility component. The remote client component is configured to receive processed data from the network component and generate instructions to the control point via the network component. The method includes establishing communication between the system within the facility and the network component, establishing communication between the network component and the remote client component, receiving information from the user concerning operation of the system within the facility, using the network component and the facility component, monitoring and controlling operation of the system within the facility based on the received information.

In some embodiments, the present invention relates to a computer program product stored on a computer-readable medium, for use with a computer configured to monitor and control a system within a facility using a communications system described above, the computer program product comprising computer-readable instructions for causing the computer to: establish communication between the system within the facility and the network component; establish communication between the network component and the remote client component; receive information from the user concerning operation of the system within the facility; using the network component and the facility component, monitor and control operation of the system within the facility based on the received information.

In some embodiments, the present invention relates to a system for controlling and monitoring a system within a facility. The system includes an access server configured to communicate with the facility, a user server configured to communicate with the access server and further configured to receive data from a user. Based on the processed received data, the building access server is configured to monitor and control the system within the facility.

In some embodiments, the present invention relates to a method for controlling and monitoring a system within a facility using a system having an access server configured to communicate with the facility, a user server configured to communicate with the access server and further configured to receive data from a user, based on the processed received data, the building access server is configured to monitor and control the system within the facility. The method includes establishing communication between the system within the facility and the access server, establishing communication between the access server and the user server, authenticating a user with the user server, receiving information from the user concerning operation of the system within the facility, using the access server, monitoring and controlling operation of the system within the facility based on the received information.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 3-7 illustrate exemplary client interfaces of the building communication/management system shown in FIG. 2.

FIGS. 8-11 illustrate exemplary service interfaces of the building communication/management system shown in FIG. 2.

FIGS. 12-17 illustrate various exemplary reference hierarchies pertaining to particular Client IDs of the building communication/management system shown in FIG. 2.

FIGS. 18-40 illustrate various application interfaces of the communications system shown in FIG. 1, according to some embodiments of the present invention.

DETAILED DESCRIPTION OF THE INVENTION

In the following description, the terms building and facility (along with their plural counterparts) will be used interchangeably and as can be understood by one having ordinary skill in the art, will be given their broadest possible interpretation. For example, a building can be a single-story one room facility or a multi-story multi-floor multi-room facility (and vice versa). Each such facility may have a single or multiple systems and subsystems that are configured to provide various functionality and/or functionalities that are used by the building(s).

In some embodiments, the present invention relates to communications systems and methods that allow users to communicate with buildings via communications network(s) or service(s). An exemplary communications system includes a building or a plurality of buildings having a plurality of systems and/or subsystems (e.g., electrical, water, oil, gas, security, HVAC, heat, etc.) having various sensory/control devices coupled to them that provide various data concerning their operation and configured to implement various monitor/control functions, thereby adjusting operation of such systems and/or subsystems; a user control device configured to allow a user to monitor/control operation of the systems/subsystems through various communications equipment that can be coupled (whether mechanically, electrically, wirelessly, etc.) to the sensory/control device and/or the user control device.

Figure 1:
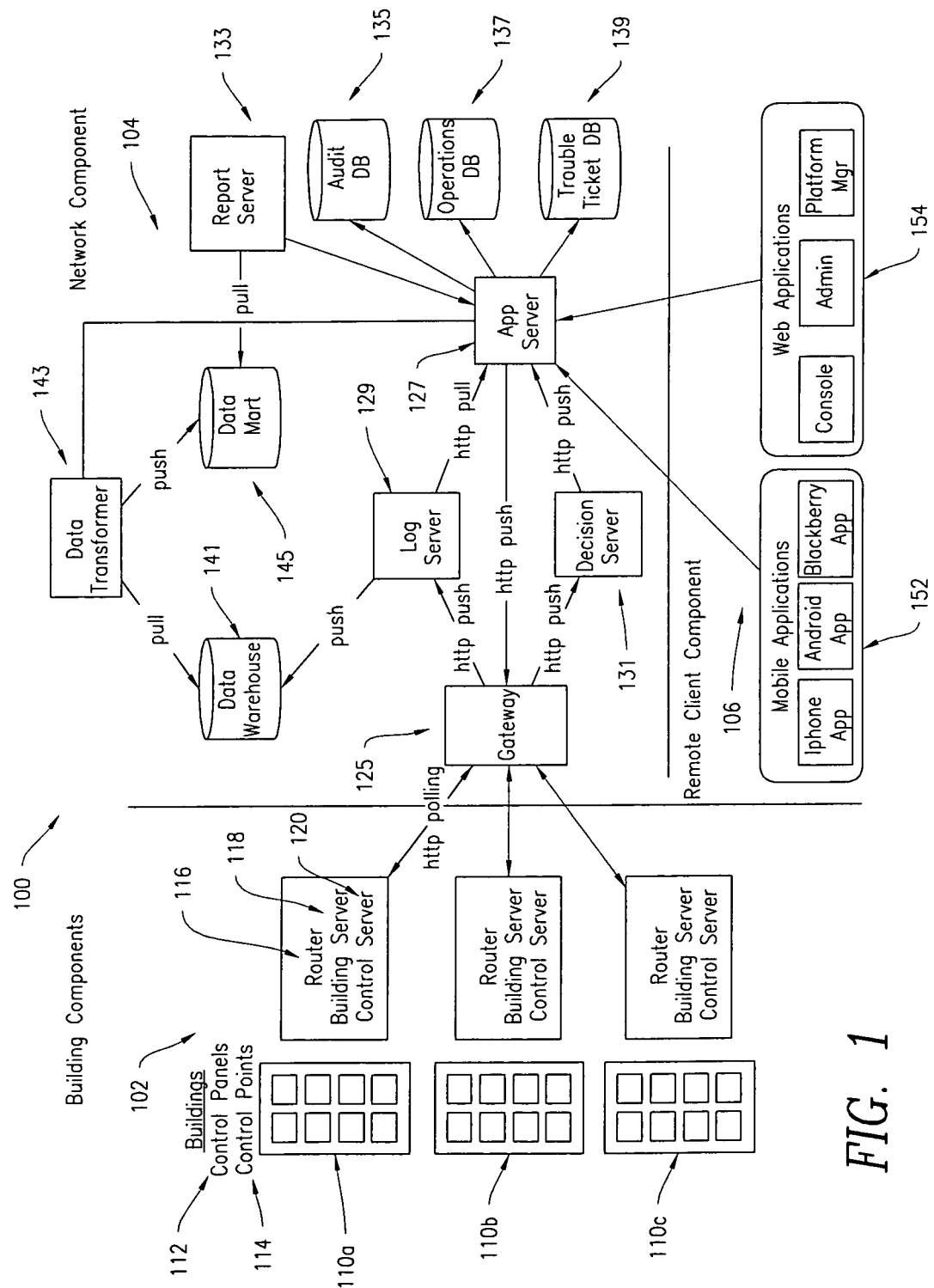
FIG. 1 illustrates an exemplary facility communications/management system, according to some embodiments of the present invention.

FIG. 1 illustrates an exemplary communications system 100, according to some embodiments of the present invention. The communications system 100 includes a building component 102, a network component 104, and a remote client component 106. The building component 102 is configured to communicatively coupled to the network component 104 and remote client component 106. The remote client component 106 is configured to communicate with the building component 102 via network component 104. As can be understood by one having ordinary skill in the art, other ways of arranging the communications system 100 are possible and the present invention is not limited to the configuration shown in FIG. 1.

The communications system 100 is configured to operate using the following hierarchy of entities and their relationships (listed from highest point to lowest point):

Clients—clients with one or more buildings registered in the communications system 100.

Users—staff or clients' staff with assigned roles within one of the applications in the remote client component 106. In some embodiments, users, as a group, may or may not include individuals that may have assigned roles defined by the client's control panel.

Sites—client-defined collections of their buildings. In some embodiments, the relationship can be geographical, but it is not limited in anyway, and client's buildings can be grouped into sites in anyway a client may choose.

Buildings—a physical (or virtual) structure containing one or more control points, e.g., an apartment building, a warehouse, a hospital, a nursing home, a restaurant, a convention center, an airport, an office building, or any other type of structure.

Systems—operational building control systems that can be defined by a primary function, such as HVAC for heating and air conditioning; access for ingress/egress points (i.e. doors, garage doors, etc.); electrical for lighting, electricity, etc.; and any other systems.

Zones—physically (or virtually) defined regions of a building that contain one or more control points, e.g., first floor, third floor east, basement, etc. Zones can be pre-defined by the client or any other user or an entity installing the communication system 100.

Groups—end-user-defined selection of control points, which can be defined by each client and/or individual user.

Control Points—individual sensors or devices that monitor and/or control various components of a building's systems/subsystems.

In some embodiments, the building component 102 can be configured to include a single building/facility and/or a plurality of buildings/facilities 110 (a, b, c) along with corresponding communications equipment and infrastructure that are configured to communicate with the network component 104. The network component 104 can be configured to include various communications, infrastructure, and/or database components that are configured to provide various functionalities, including but not limited to, communications, storage, reporting, operation, and any other components that are configured to provide various functionalities for the system 100. The remote client component 106 can be configured to include various mobile applications 152 and/or web applications 154 (or any other applications) that can be configured to provide a user with an ability to monitor and control various buildings/facilities in the building component 102. The following is a more detailed description of the components 102, 104, and 106, their constituents, and operation of the system 100.

As stated above, the communications system 100 is configured to allow users to monitor, control and/or manage a wide range of building functionalities through a web interface or via mobile devices, which are shown in the remote client component 106. For example, in some embodiments, the user(s) can remotely manage HVAC, access, security, lighting, electrical, heat, and other systems through the remote client component 106. In some embodiments, the remote client component's mobile applications 152 can be configured to include Apple's iPhone application, Verizon Wireless' Android application, Blackberry application, and/or any other type of wireless device application. In some embodiments, the remote client component's web application's 154 can be configured to include a PC console, an Administrator console, a platform manager console and can be configured to be operated from a personal computer (that can include a monitor, a processor, a keyboard, a mouse, and/or any other components). As can be understood by one having ordinary skill in the art, the present invention is not limited to the above-referenced remote client components and can include any suitable device, including but not limited to, PC, telephone, wireless telephone, blackberry, smartphone, iPod, iPhone, iPad, Palm device, touchscreen device, or any other desired device.

As can be understood by one having ordinary skill in the art, the network component 104 can be configured to be any network, including but not limited to, local area network ("LAN"), metropolitan area network ("MAN"), wide area network ("WAN"), Internet, extranet, intranet, or any other local and/or remote type network that can be configured to operate in accordance with design features of the communication system 100. In some embodiments, the network component 104 can be configured to operate and/or reside outside the building component 102 and/or the remote client component 106. Further, in some embodiments, the network component 104 can be also configured to include computational elements of the system as well as end-user applications/interfaces, such as, web interface(s) and/or application(s) on a mobile device for connecting to the communications system 100.

Referring to FIG. 1, various components of system 100 are configured to communicate with one another as well as exchange various data, commands, signals, etc. The data exchange between the components occurs in an "upstream" and "downstream" fashion. In some embodiments, "upstream" communication implies data, signals, and/or commands that are configured to flow up to or along a communication path (whether wired or wireless) toward a building/facility; "downstream" communication implies data, signals, and/or commands that are configured to flow down to or along a communication path (whether wired or wireless) toward a user and/or an object or a component in the network component 104. As can be understood by one having ordinary skill in the art, the communications between components in the system 100 can be upstream, downstream, and/or upstream/downstream. Elements of various components can be configured to be controlled by the user, system 100, components 102, 104, 106 and/or various combinations thereof.

As shown in FIG. 1, the building component 102 is configured to include at least one building 110 (a, b, c). Each building 110 includes control points 114 and control panels 112. Each control point represents a communication device (e.g., a sensor, a detector, etc.) that is coupled to or represents an element of or an actual particular system within a building, such as, electrical, lighting, heat, oil, gas, HVAC, security, etc. Control panels 112 are configured to communicate with control points 114 to receive/transmit data from/to the control points 114. For example, a control point 114 can be a sensor installed on a boiler's temperature gauge and can be configured to transmit temperature of hot water within the boiler whereas another control point can be installed on a burner ignition that is configured to receive a command to turn on the ignition if the water temperature within the boiler falls below a predetermined threshold. As can be understood by one skilled in the art other types of control points and respective communications can be provided. The building component 102 further includes a router 116, a building server 118, and a control server 120. These components are configured to be communicatively coupled to one another as well as various elements within the network component 104 and elements of the buildings 110. In some embodiments, each building 110 can be configured to have a separate router 116, building server 118, and control server 120. In alternate embodiments, a single router 116, a single building server 118, and a single server 120 can be configured to control a at least one or a plurality of buildings 110.

Prior to communications system 100 becoming operational, control points 114 and control panel 112 are installed in the various identified utility, security, or other systems located within buildings. The control points are configured to be installed at any point within the identified building system that the user desires to control (e.g., lighting, door open/close alarm, boiler, thermostat, etc.). As can be understood by one having ordinary skill in the art, each identified system can be configured to have a plurality of control points disposed at various locations within the system and/or several control points can be disposed at one location in the identified system and configured to measure, detect, sense, read, etc. various data associated with the location or element of the identified system at which such control point is installed. The control point can be a combination of a location, element, etc. of the identified system as well as a detector, sensor, reader, etc. that is installed on such location, element, etc. of the identified system. Along with the installation of the control points, a control panel is installed in the building that is configured to communicate with the control points, that is, the control panel is configured to transmit/receive data, instructions to and from the control points and to transmit/receive data from other components in the communications system 100, as will be detailed below. As can be understood by one skilled in the art, exemplary control panels can be an ELK panel manufactured by Elk Products, Inc., Hildebran, N.C., USA or a BrightBlue panel manufactured by Ingersoll-Rand Plc., Dublin, Ireland, or any other panel suitable for the purposes of the communications system 100. In some embodiments, each control panel can include various identification information, including but not limited to, control panel type (e.g., Elk, BrightBlue), local area network, public IP address, network security information, as well as any other information that may be used for providing access to the building from the communications system 100. As can be understood by one skilled in the art, there can be more than one control panel 112 installed in the building 110.

In some embodiments, during a building/user setup procedure, the communications system 100, specifically, the control server 120, is configured to connect, via the building server 118 and a local area network, to the building's local control panel 112 to obtain a listing of all control points and/or devices currently configured in the control panel 112. In some embodiments, the control panel is installed first along with the control points/devices and the control points/devices are communicatively linked with the control panel. The list of control points can then be used to populate the control server 120 with a corresponding listing of control points, named according to a predetermined convention. Once a listing of control points 114 in a building 110 is acquired and mapped to the control server 120, validity of the listed control points 114 is verified. Such process can be manual, semi-automatic, automatic, and/or a combination of the above. Control points 14 that are listed that may be non-operational (e.g., not actually connected, or labeled incorrectly, etc.) can either be deleted or held back from the next step. In some embodiments, once validated, the list of control points 114 can be used to generate an intermediate "control-point-definition file" or an "intermediate file" that describes the configuration of control points 114 in a specific building 110.

In some embodiments, each control point can be configured to be assigned to at least one of the following: (1) a zone, which can correspond to a physical region associated with the building, e.g., a floor, a room, a hallway, a basement, outside garden, roof, etc.; (2) an operational function(s), e.g., heating, HVAC, lighting, security, humidity level, etc.; and (3) a group(s), which can be user defined collection(s) of points or a point that are configured to provide an end-user interaction with the operational function(s). In some embodiments, initial zone, system, group information can be assigned to the listed control points in the intermediate file. The intermediate file can be transformed or translated into a final "Building XML Definition File," which is an XML format file used to provide configuration information for various components of the communication system 100. Such process can be performed manually, semi-automatically, and/or automatically.

In some embodiments, control points 114 can be assigned to sensors, detectors, readers, controllers and/or control devices. Such devices can be actual devices that are used to sense, monitor, and/or control various building functionalities and/or operations. These may include, but are not limited to: temperature sensors, thermostats, motion detectors, magnetic door locks, etc. In some embodiments, the building owner can be responsible for maintaining such devices. Because control points 114 are already disposed on the building devices which they monitor, sensor, and/or control, there is no upstream communication associated with these points. However, the control points are configured to communicate with a respective control panel 112 to which such control points 114 are assigned and/or control server 120. Communication with the control server 120 is accomplished directly or via the control panel 112.

As stated above, building 110 can be configured to include at least one control panel 112. In some embodiments, the control panel(s) 112 can be device(s) that provide central distribution and/or connection location for individual control points 114 within a building 110. An example of a control panel is an ELK panel. Other examples include a BrightBlue panel, dedicated HVAC control panels manufactured by Trane, Inc., Siemens AG, lighting control panels manufactured by Lutron Electronics, Inc., and others. In some embodiments, control panels can be configured to provide local functionality and/or control over building functionalities and/or operations of its various systems and subsystems (e.g., HVAC, electricity, lighting, security, etc.). In some embodiments, the control panel 112 can be configured to include software or other means for the user to initialize, update or otherwise manage the control panel 114. In some embodiments, the control panel can be managed by the building owner.

The control panel 114 is configured to communicate upstream with various control points assigned to individual sensors/devices, e.g., thermostats, lighting controls, temperature monitor, etc. On the downstream, the control panel 114 is configured to communicate with the control server 120. Such communication can be on a direct or indirect basis, i.e., directly for standard protocols and/or indirectly for non-standard protocols, which included but are not limited to, Elk M1 ASCII protocol, Bright Blue XML-RPC, and others. Additionally, the control panel 114 is configured to communicate on the downstream path with the building server 118. In some embodiments, the control panel 114 can be configured to receive and/or transmit various data and/or commands that is used to implement monitoring and control of the control points 112.

The building component 102 is further configured to include a control server 120. The control server 120 is configured to provide an interface to standard building control protocols. For example, such protocols, include but are not limited to, Bacnet, Lontalk, and Modbus. As can be understood by one having ordinary skill in the art, other protocols are possible. The control server 120 is configured to provide for onsite collection and management of data generated by a control point 114. In some embodiments, a gateway 125 is configured to poll the control server 120 to collect data and submit operator or automated commands to the building control system. In the case of a building with standard protocols as listed above, the control server 120 can be configured to communicate directly with a compatible control panel 112 or individual device or control point 114. However, if the control panel 112 does not support one of the standard protocols then custom software can be configured to manage communication between the control server 120 and the control panel 114, where such software can be configured to reside on the building server 118. Referring to FIG. 1, the control server 120 is configured to communicate with control panel 114 and/or specific control point 112 (if communicating directly with a point) on an upstream path. Additionally, the control server 120 is also configured to communicate with the building server 118 to account for any non-standard control panel communication. On the downstream path, the control server 120 is configured to communicate with the building server 118 (in some embodiments, for proxy purposes only) and the gateway 125. In some embodiments, the gateway 125 is configured to retrieve/send control point data from/to the control server 120 via secure communication channel provided by the building server 118. The communication can include various data (e.g., sensor readings, detected information, and/or other data) as well as commands.

The building server 118 is configured to provide several functions including communication between the building component 102 and the network component 104. In some embodiments, the building server 118's function can include:
  encrypted communication, via reverse-proxy, between the in-building components and the Gateway 125;
  running custom software and/or other programs to manage communication between the control server 120 and non-standards based control panels. In some embodiments, the building server 118 can be configured to operate custom scripts that facilitate communication between the control server 120 and the control panel 112. As can be understood by one skilled in the art, there can be any number of scripts that the building server 118 can be configured to operate.
  providing a local cache and logging mechanism to record building data and system operational record. This enables the system to log every control action or event that occurs at a building and maintain a fine-grained record of events. Further, this provides a fail-safe on lost local data, since in the event the Internet connection to a building fails, the system can recover the historical log of actions and events that occur locally at a given building.

The building server 118 is configured to communicate on an upstream communication path with the control server 120 when standard protocols are implemented. Alternatively, the building server 118 is configured to communicate with the control panel 112 or specific control point 114 when non-standard protocols are implemented. On the downstream communications path, the building server 118 is configured to communicate with the gateway 125 and is further configured to connect to the building via a secure connection. This communication channel can be configured to be transparent.

The building components 102 also includes a router 116. In some embodiments, the router 116 is configured to provide a transparent layer of security and logically segment the in-building components or elements from any of the client systems that may also reside on the building's local area network (assuming that all control devices as well as other systems in the building reside on a same local area network). In general, all building components can be configured to sit behind the router 116, in order to isolate them from the building's local area network. In some embodiments, the router 116 can be configured to only segment the local network and can be essentially transparent to normal operation of the communications system 100. Further, on the upstream communication path, the router 116 is configured to communicate the building server 118 and the control server 120, where such communications can be configured to be transparent. On the downstream path, the router 116 is configured to transparently communicate with the gateway 125.

As stated above, using the building component 102's elements, the user is able to receive data (e.g., sensory data) and transmit commands to the building's functionalities for the purposes of management and/or control such functionalities (e.g., HVAC, electrical, telephone, lighting, gas, oil, heat, humidity level, etc.). Using these elements in the building component 102, the user is able to collect various current and/or historical data about operation of the building and/or its particular systems and make any requisite decisions whether or not to adjust operation of a particular functionality with the building. Such adjustments can be done manually, semi-automatically, and/or automatically.

The following is a description of an exemplary network component 104 of the communications system 100, according to some embodiments of the present invention. The network component or components 104 can be configured to operate in one or more data centers that can be accessible from LAN, MAN, WAN, the Internet, mobile networks, or any other network. These components are further configured to interact via various communication protocols, primarily HTTP, and utilize various REST-based application programming interfaces ("API"), as well as, industry standard data formats to exchange data, information, and command and control messages. As can be understood by one having ordinary skill in the art, other ways of providing communication between network component, its elements and other components in the communication system 100 are possible. The present invention is not limited to the illustrated embodiment.

In some embodiments, the network component 104 is configured to include a gateway 125, an application server 127, a log server 129, a decision server 131, a report server 133, a data warehouse 141, a data transformer 143, a report database (also known as data mart) 145, an audit database 135, an operations database 147, and a trouble ticket database 139. The building component 102 is configured to be communicatively coupled to the network component 104 via the gateway 125. The gateway 125 is configured to be communicatively coupled to the application server 127, the log server 129, and the decision server 131 via various Hypertext transfer protocol ("HTTP") pull/push procedures. An HTTP server push (also known as HTTP streaming) is a mechanism for sending data from a web server to a web browser and can be achieved through various known mechanisms. An HTTP pull is a mechanism for receiving/retrieving data. The application server 127 is configured to be communicatively coupled to the report server 133 and databases 135-139 via similar mechanisms. The report server 133 is in turn communicatively coupled to the report database 145. The log server 129 is communicatively coupled to the data warehouse 141. The application server 127 also communicates with the remote client component 106 and its various applications 152 and 154.

As stated above, the gateway 125 is one of the mechanisms that the network component's elements are configured to communicate with the elements of the building component 102. As can be understood by one having ordinary skill in the art, various elements of the network component 104 can communicate directly with various elements of the component 102. The gateway 125 is configured to: 1) "poll" a building 110 and obtain state/data information and updates, 2) send "commands" to the building 110 to control various building operations (e.g., turn on a light, change a set-point on a thermostat, etc.), and 3) disseminate building data to the appropriate element of the network component 102 for further processing or display. In some embodiments, the polling aspect of the gateway 125, as shown in FIG. 1, can be accomplished through extracting data directly from the control server 120 or via a customized data transport method, thereby eliminating direct interface with the control server 120. As illustrated in FIG. 1, on an upstream path, the gateway 125 communicates with the building server 118 for communication purposes and the control server 120 for data acquisition. The building server 118 provides a transparent secure communication tunnel so the data transfer between the gateway 125 and control server 120 is encrypted over a network, e.g., the Internet, or any other type of network.). On the downstream communication path, the gateway 125 is configured to communicate with the application server 127, which is responsible for routing data to remote client component's application(s) and/or users, as well as, generating notifications of specific events, and data pushing. The application server 127 is configured to push data via an HTTP server push mechanism to the gateway 125. The application server 127 will be described in more detail below. On the downstream path, the gateway 125 is configured to communicate with the log server 129 and the decision server 131. The log server 129 is configured to perform continuous logging of state changes and events (e.g., temperature drop is detected in the boiler, humidity level is above a predetermined threshold, etc.)

In some embodiments, the application server 127 is configured to respond to user devices, such as, web applications 154, mobile applications 152, or any other applications that are part of the remote client component 106, e.g., iPhone, iPad, iPod, Blackberry, cellular telephone, PALM, PDA, and other devices' applications). The application server 127 is further configured to ensure that each client's application 152, 154 receives up-to-date data on the values of control points 114, as well as, pass on commands from the applications down to the building 110 via the gateway 125. Information that can be received by the application server 127 from the control points 114 can include values indicating a particular state (e.g., on/off) or a specific numerical value, for example, temperature in an area within building/facility 110, humidity level with an area, oil level in an oil tank of the building/facility, gas pressure in the building/facility gas supply line, whether a door to a particular facility is open and for how long it was open before it was closed, whether the lights are turned on in an area within the building/facility, etc. As can be understood by one skilled in the art, a single control point can provide monitoring and control of an entire system within the building 110 or multiple control points can be assigned to the system/subsystem within the building 110. For example, a lighting system in the building 110 can include a control point assigned to every bulb in the building, where such control point is configured to provide a readout as to whether a light is on/off/out. The user through the application server 127 and the gateway 125 is configured to provide commands/instructions to control systems and subsystems within the building 110, for example, turn on/off lights, heat, HVAC, activate/deactivate security, call repair service, etc.

In some embodiments, where each user of the communication system 100 is assigned a specific role (e.g., owner, manager, customer service representative, service technician, etc.) the application server 127 can be further configured to manage all user permissions, alert notification lists, building definitions, as well as manages various operational databases 135-139. Specifically, if a particular user of the system 100 has a restricted access, then application server 127 would allow that user to access certain parts of the system 100 but not others so as to prevent an unauthorized change to the system's operational components and/or reporting. In some embodiments, the owner has a system-wide access allowing the owner to change any and all parameters about the owner's buildings. A customer service representative would have a partial access to the system 100's elements so as to be able to provide information about system's operation to the user requesting information, however, the representative may be restricted from accessing certain secure parts of the system. As can be understood by one skilled in the art, various users of the system can be granted different security and access levels, which can be altered based on appropriate permissions. In some embodiments, the application server 127 can also include various APIs, which other components in the system can utilize to request data and system configuration information.

As shown in FIG. 1, on an upstream communication path, the application server 127 is configured to be communicatively coupled to the gateway 125, which provides control point status information to and receives control point command data from the application server 127. The communication between the application server 127 and the gateway 125 is accomplished on the basis of the HTTP server push mechanism.

The application server 127 is also coupled to the log server 129 and is configured to provide logging data and information to the log server 129 concerning control point status, commands sent to control points from user or other elements of the system 100, commands executed at or by control points, and any other information about operation of the communication system 100. In some embodiments, the communication between the application server 127 and the log server 129 is accomplished through HTTP server pull mechanism.

The application server 127 is also coupled to the decision server 131 that is configured to send notification messages to the application server 127. The decision server 131 is configured to determine whether a "notification event" has occurred based on settings that may be pre-defined by the user. If a notification event has occurred, a notification message is configured to be generated, which can include at least the following information: control point name, current state, event trigger (e.g., a predefined temperature range is exceeded, predetermined humidity level is exceeded, lighting has been left on beyond a predetermined period of time, etc.). The decision server 131 then sends the notification message to the application server 127, which is configured to maintain a list of users who are subscribed to receive such notification message and send out the notification message to the designated users over various communication channels (e.g., email, push, in-application, and SMS messaging, telephone call, or any other means).

On the downstream communication path, the application server 127 is configured to communication with various applications 152, 154 in the remote client component 106. The applications allow users of the system 100 to provide various command and control data, information, and instructions to elements of the system 100. In some embodiments, the application server 127 is also configured to be coupled to a push notification service(s), which can be external services that "push" data to mobile devices/applications (such as Apple's Push Notification Service, RIM's Blackberry push notification services, and others).

The log server 129 is configured to capture state changes at the building, as provided by the gateway 125, and to store them in the data warehouse 141. Such storage can be accomplished on a continuous basis, periodically at predetermined intervals, automatically upon detection of a change, or in any other pre-select manner. The log server 129 can be configured to pull its configuration information from the application server 127, including obtaining a current list of buildings for each client/owner/user. Whenever values of control point(s) 114 are updated, the log server 129 is configured to record such values and/or any state changes associated with such an update. As stated above, the log server 129 is configured to write the data to the data warehouse 141.

Thus, on the upstream communications path, the log server 129 is configured to be communicatively coupled to the gateway 125 for receiving data and state change information on control points and the application server 127 for obtaining initial configuration information. On the downstream communications path, the log server 129 is configured to be coupled to the data warehouse 141 for maintaining a record of each control point monitored by the system 100.

The decision server 131 is configured to provide an intelligent control within the communications system 100. In some embodiments, the decision server 131 is further configured to provide an automated response to user-configured conditions. For example, such responses can include automatically turning on the heat once the outside temperature reaches a pre-defined set-point temperature. In some embodiments, the decision server 131 is further configured to manage alert notifications that are can be generated based on the data received from the control points within a building 110. That is, if a given control point reaches a state defined by the end-user, the decision server 131 is configured to generate a notification message to be sent to one or more end-users (i.e., applications 152, 154, etc.). The decision server 131 is further configured to receive data on the status of control points directly from the gateway 125 and can be further configured to use the application server 127 for managing dissemination of the notification messages.

As such, the decision server 131 is configured to be communicatively coupled to a gateway 125 on an upstream communication path for receiving data from the control points concerning events, state changes, commands, etc. On the downstream, the decision server is communicatively coupled to the application server 127 for pushing notification and other command, state, event data and information.

The report server 133 is configured to manage delivery of historical data and analysis to the end user via a web interface. In some embodiments, the report server is configured to interact with the application server 127 to deliver any historical reports requested by a user or an element of the system 100 to the appropriate end-user. As stated above, the application server 127 can be configured to manage access to such reports for the purposes of management and data analysis. The report server 133 is further configured to retrieve processed historical data from the report database 145, as illustrated in FIG. 1. Such retrieved data can be used to generate various reports or prompt the user or various elements to generate appropriate commands or other alerts. In some embodiments, the data warehouse 141 can be configured to have an unlimited amount of storage for storing the historical data of the communications system 100. In alternate embodiments, the data warehouse 141 can be configured to have a predetermined storage threshold beyond which historical data can be archived, compressed, transferred offsite, deleted and/or purged based on age, importance, use, and/or other parameters.

The report server can be configured to generate reports by a collection of buildings, a building, a zone, a group, and/or by a control point. In some embodiments, the report server 133 can be configured so that access to the historical data is limited based on a particular user and/or user preferences. The application server 127 can also be configured to allow/limit such access.

As such, the report server 133 is configured to be communicatively coupled to the data warehouse 141 and the reporting database (also known as data mart) on an upstream communications path. Such communication is accomplished using a data transformer 143 that communicates with the data warehouse 141 and the reporting database 145. The data transformer is configured to process raw data stored in the data warehouse 141 and provide it to the reporting database 145 for further processing by the report server 133. The data warehouse 141 and reporting database 145 can be any storage facilities or repositories. In some embodiments, the data transformer includes scripts or programs that are used to process the raw data from the data warehouse 141. In some embodiments, these scripts can be pre-defined and could be configured by the end-user for the purposes of generating new, unanticipated reports. An example of such processing is pre-computing a date-limited range of average temperatures in a building. Hence, on the downstream communication path, the report server is coupled to the application server for delivering requested "reports" to the end-user application.

As can be understood by one having ordinary skill in the art, each of the servers 127-133 can include a processing equipment that is capable of receiving/transmitting data, processing and managing data, a communications equipment capable of providing communication path(s) between various elements of the system 100, a memory components, and/or any other requisite components.

Referring to FIG. 1, the databases 135-139, 141, and 145 are configured to receive, maintain, and store various "live", raw, processed, and/or historical data, as well as, any other data that is generated in connection with operation of the system 100. In some embodiments, the system 100 can be configured to have data compression, archival, backup policies that allow for efficient management of data. Various data can be moved to offsite repositories, compressed, deleted, purged, or otherwise manipulated to reduce storage capacities of the appropriate databases.

The following is a description of each database illustrated in FIG. 1. As can be understood by one having ordinary skill in the art, the present invention is not limited to the number of databases or storage facilities show in FIG. 1. Other databases can be added to the system 100 to serve various storage and processing purposes.

As stated above, in some embodiments, the data warehouse 141 can be configured to maintain historical control point and event data that may be going back to the initial start of the communications system 100 and as such it can contain data from the first time a particular building 110, control point 114, etc. have been activated. The data warehouse can be populated manually, semi-automatically, and/or automatically from dumps from a log database, which can be internal to the log server 129, and which can be into the data warehouse periodically. The data warehouse 141 can be also manually, semi-automatically, and/or automatically updated using the data from the log database on a pre-determined basis (e.g., hourly, daily, weekly, monthly, etc.) or on other configurable time scale.

The report database (also known as data mart) 145 can be configured to contain processed raw data from the data warehouse 141, which has been processed by the data transformer 143. The report database can be updated on a predetermined basis (e.g., daily, weekly, and monthly data). Such data can represent activity of various elements of the communications system 100, including data associated with operation of various building 110 systems/subsystems as represented by the control points 114. As stated above, the data can be provided on an up-to-the minute, hourly, daily, weekly, monthly, yearly, etc. These periods of time can be custom-defined by the user/building manager/building owner of the system 100.

The audit database 135 is configured to contain a log of all activities initiated by the users within the communications system 100. These may include commands from the user, automatic commands by the system generated based on specific settings, or any other data exchange. In some embodiments, the audit database 135 can be populated by the application server 127. The audit database can be configured to simply record the action of any human-initiated process in the communication system 100.

In some embodiments, the network component 104 can be configured to include a log database that contains various historical control data. In some embodiments, the log database can be configured to store data going back more than a predetermined time period (e.g., a week, a month, a year, etc.). The log database can be updated based on a predetermined system configuration and can be populated by the log server 129.

In some embodiments, the operations database can be configured to maintain configuration information for the system 100 based on client information (e.g., site configurations, buildings, user lists, etc.), building information (e.g., lists of control points, etc.), and user information (e.g., permissions, groups, etc.).

The trouble ticket database 139 can be configured to store and manage end-user and system 100 initiated support requests, which are known as trouble tickets. These can include various alerts, requests for service and repair, as well as any other actions. In some embodiments, a trouble ticket can be describe the problem, time submitted and current status and once resolved a description of the resolution and date/time of resolution.

Referring to FIG. 1, the communications system 100 can be configured to include remote client component 106 that includes mobile applications 152, web applications 154, and/or other applications that can allow a user to control buildings 110. As shown in FIG. 1, the web applications can be configured to include a console application (as shown in FIGS. 36-40), which can be used by end users to monitor and control building function; an administrator application (as shown in FIGS. 31-35), which can be used by client (e.g., user, building owner, manager, etc.) staff to administer their accounts with system 100, staff user accounts and building profiles; and a platform manager application (as shown in FIGS. 18-30) which can be used by the staff to manage client accounts, billing, provide client support, as well as monitor and control client buildings. In some embodiments, there are also corresponding mobile applications 152 that allow users to activate or monitor control points for which they have permission. In addition, the mobile applications allow partial control over a users profile information. As can be understood by one skilled in the art, the applications are not limited to those shown in FIG. 1. The applications and the system 100 can be configured to be adaptable to any systems/subsystems as well as local networks used by the buildings and/or their owners, managers, and/or other users.

Figure 30:
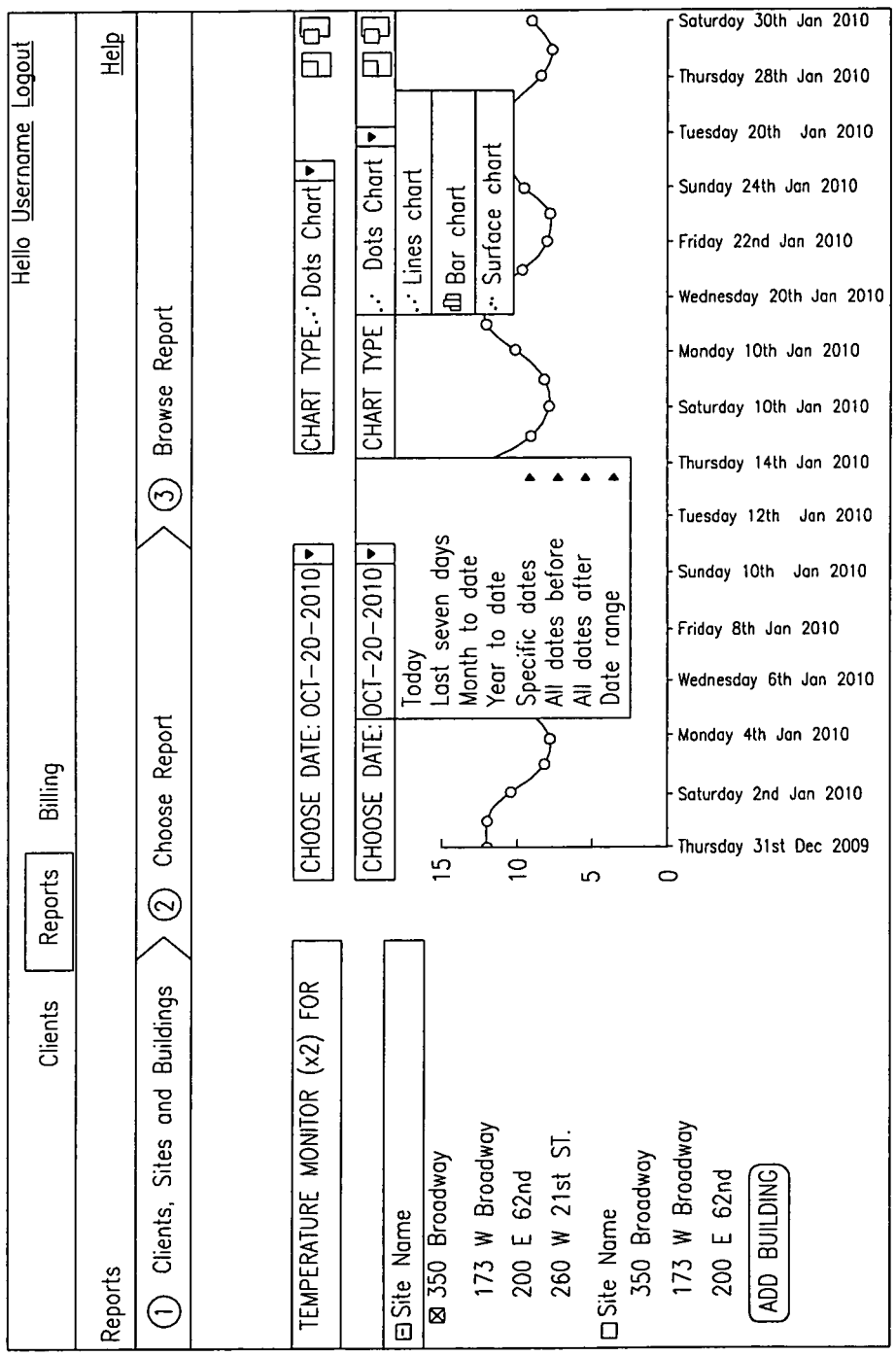
Figure 37:
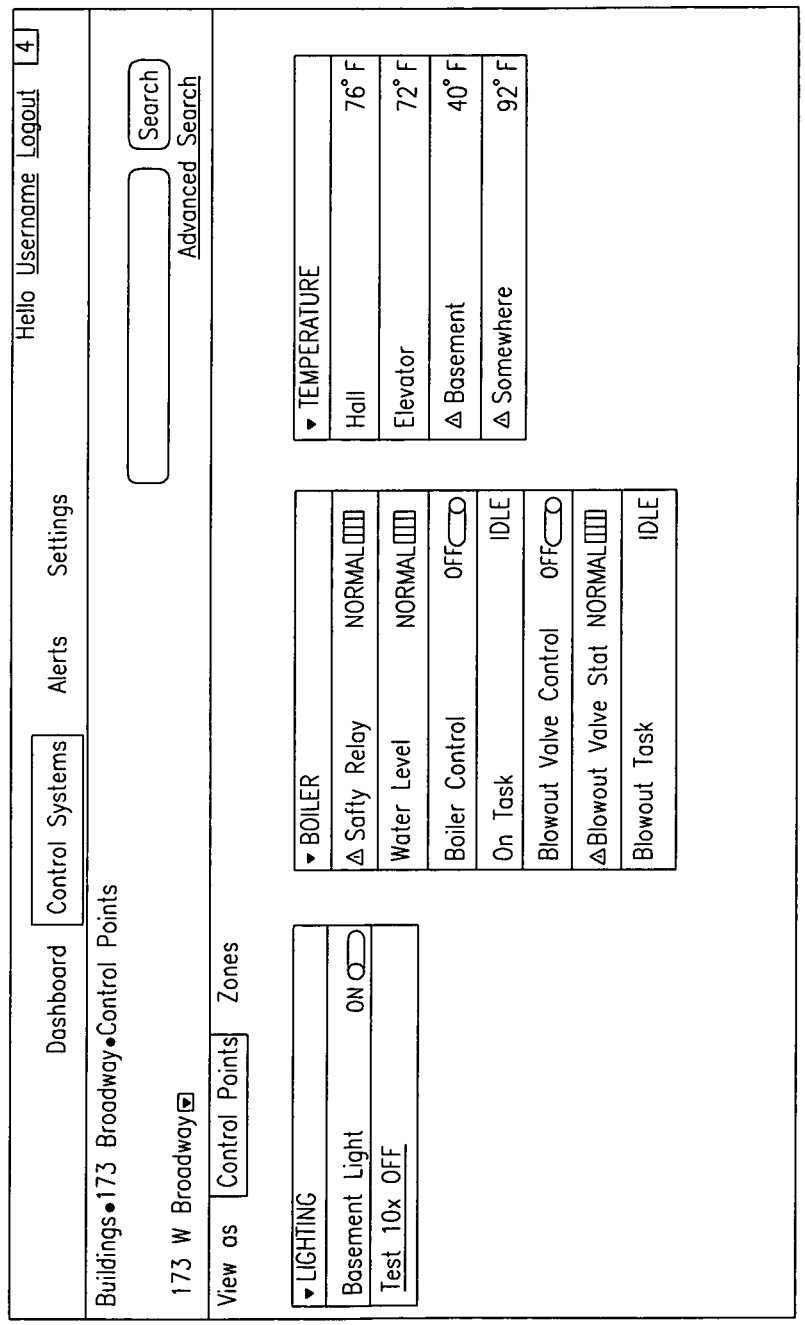

Referring to FIGS. 18-30, the platform manager web application is configured to provide the user, client, owner of the system 100 with a listing of facilities/buildings along with appropriate locations and contact information as well as providing status of each identified facility (FIG. 18). The platform manager is also capable of providing information about the number of sites, buildings, systems, zones, and control points as well as any warnings that may have issued for the identified properties (FIG. 19). In some embodiments, the user/client/owner can add a building to the list of buildings (FIG. 20). FIG. 21 illustrates access level granted to each person associated with a particular property along with appropriate contact information. For example, some users can be listed as administrators having the highest level of access, as indicated by the "^" symbols. FIG. 22 also provides information for each particular user and sites/buildings along with appropriate status and warnings. FIGS. 23-25 identify roles of each person authenticated on the system. FIG. 26 illustrates each building along with associate site and client information and periods of updating the information. FIG. 27 illustrates an exemplary window that can be used to create new billing information. FIGS. 28-30 illustrates a sample report that can be generated for each building associated with a client. The report can illustrate information about various parameters, including temperature changes, humidity level changes, electricity consumption, oil consumption, gas consumption, security information, and other reports. Various elements of the communications system 100 are configured to analyze data received from the buildings' control points and generate reports having various degrees of depth of information, e.g., a number of time a particular person entered a specific zone within a building, the number of minutes that person was in that zone before exiting, and any other information that may be desired by the user and/or client.

FIGS. 31-35 illustrate an exemplary administrator interface, according to some embodiments of the present invention. These figures illustrate the type of information that is available to an administrator for a particular client but that may not be available for other users authenticated for the client. The administrator may have various rights and privileges, such as adding and/or removing users, sites, buildings, zones, control points, etc., monitoring information about particular parameters of buildings' systems and subsystems, and other functions.

FIGS. 36-40 illustrate an exemplary console web application, according to some embodiments of the present invention. Such console can be available to users and may have varying degrees of accessibility based on a particular user's status with the client.

In some embodiments, the user receives access to the communications network/service and also adds user's buildings/facilities to the service. Once the user and the user's buildings are added to the network/service, the user and the buildings are able to communicate with one another, whereby the user is capable of sending messages, control signals, commands, etc. to the buildings' systems and the buildings' systems are able to respond to the user with reports, alerts, etc. In some embodiments, hardware, sensors, etc. may be installed at user's buildings for allowing the user and buildings communications. In some embodiments, on-site technicians can provide installation of equipment to enable Internet connectivity and system/sensor/device level access to the building systems. In some embodiments, support staff may be involved in the installation process and setting up a web interface for managing the process. Additional staff may be needed to ensure that each one of user's buildings has the proper equipment necessary to provide interne access and bi-directional flow of information and control inputs.

To operate the present invention's network/service, the user logins to setup various user accounts. In some embodiments, such user accounts can be on various user access levels: Administrator, Supervisor, or Staff These user levels are described in more detail below. User can also establish Access Groups that can provide easily-defined sets of privileges to be extended to users. Once the user's building/facility is configured in terms of hardware and connectivity the building may be added to the user's account. A user's Supervisor user logins to the service and can add new buildings, facilities, etc. Additional support may be needed to maintain the system. Once the building is added, Control Points, which can correspond to actual building system devices can be added and configured. In some embodiments, control points can be configured to correspond to whole systems or subsystems within a system, e.g., sensors that monitor and/or control performance of a particular system component (e.g., temperature) or the system as a whole (e.g., boiler system, HVAC system, etc.). Once the connection between buildings, user, and the network are established, the users are able to monitor and control day-to-day operation of any building system and/or subsystem under the client's account, depending on the user's Group membership.

In some embodiments, the communications system 100 can be configured to provide a comprehensive reporting on per user and/or aggregate basis. The communications system 100 can be configured to generate local and/or global reports on building system operations, as well as user actions. Local reports can be configured to apply to a single building and/or facility. Global reports are based on whatever grouping the user decides to use (including, but not limited to address, city, state, region, country, etc.).

In some embodiments, the communications system 100 can be configured to perform mining of the operational data to provide aggregate or targeted reporting and recommendations on building operations. For example, the communications system 100 aggregated/targeted reports can support a green rating of buildings, where reporting provides an insight into how much energy is being used by the buildings based on consumption of various energy resources (electricity, oil, water, gas, etc.), emissions and/or exhaust from spent fuels, production of unusable content (e.g., trash, etc.), and other parameters that can be used to calculate the "greenness" of a building and/or buildings. Such reports can also provide a measure of the efficiency of a particular building or group of buildings. Groupings may be by client, locale, or region, as well as system type.

In some embodiments, the communications system 100 is easy to setup from the user's perspective and does not require any special software installation for individual users. In some embodiments, a web application may be implemented that uses, for example, a broadband interne connection and 228-bit capable browser. In some embodiments, the user can communicate with the buildings via user's mobile telephone, blackberry, iPhone, iPod, iPad, PDA, laptop, personal computer, regular telephone, or any other communication device using SMS, mobile browser or any other type of communication protocols. Using the present invention's system, the user is capable of controlling and/or monitoring various building systems, e.g. HVAC, lighting, security, etc. In some embodiments, the present invention's system can be made compatible with various interne browsers such as Internet Explorer, Firefox, Safari, etc. The present invention is also capable of working with GoogleTalk, various Instant Messengers (including AIM, MSN Instant Messenger, Yahoo! Instant Messenger, and others) As stated above, in some embodiments, the present invention can be configured to use international and open source standards for building communication, such as LonTalk, Bacnet, and others. The communications system 100 can be configured to perform comprehensive reporting and historical record of building operational information. The communications system 100 is further configured to provide aggregate data collection and processing for the purposes of comprehensive reporting on local, regional, and global basis.

Figure 2:
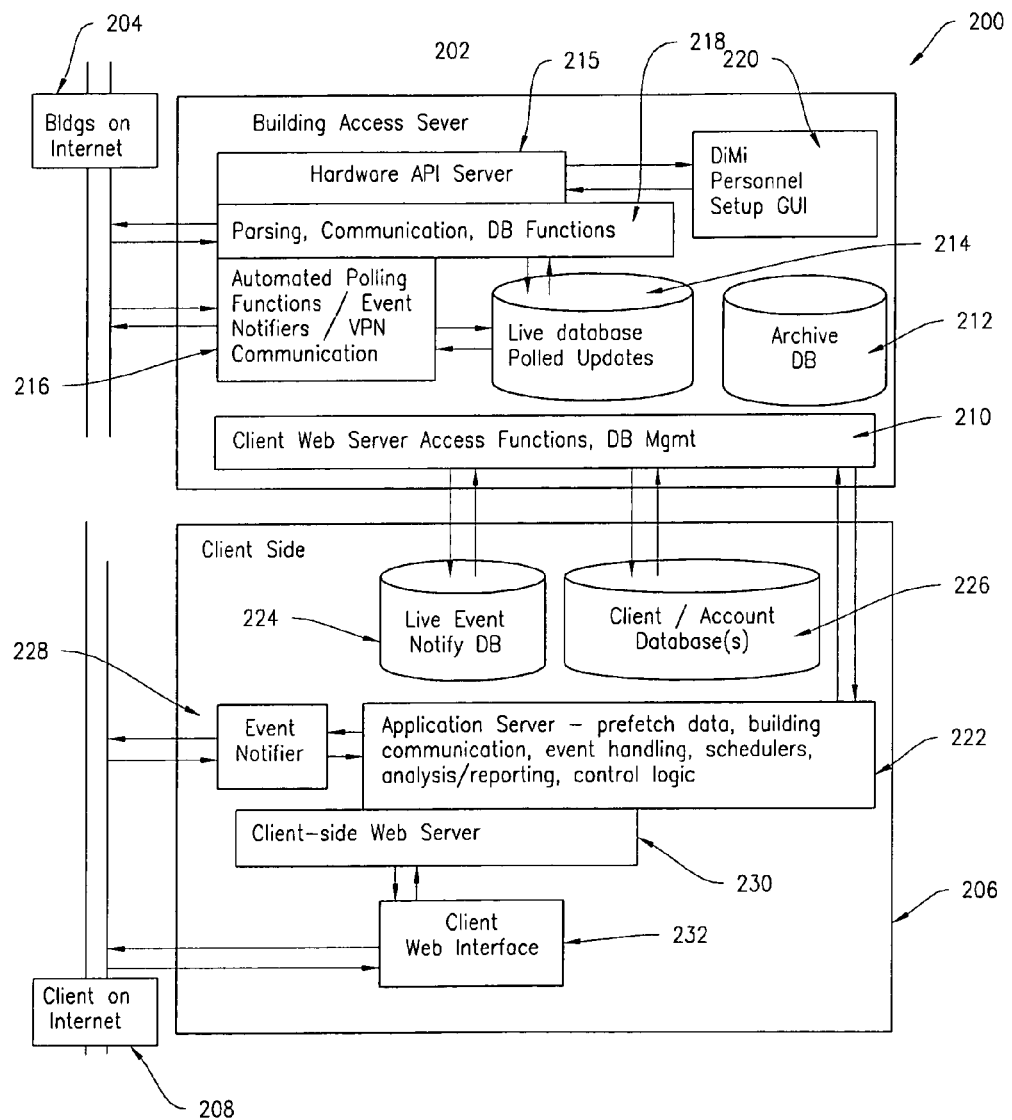
FIG. 2 illustrates another exemplary building communication/management system, according to some embodiments of the present invention.

FIG. 2 illustrates an exemplary physical architecture of an alternate embodiment of a communication system 200, according to some embodiments of the present invention. The system 200 includes a building access server 202 that is configured to communicate with a building or a plurality of buildings 204 and a client side 206, where the client side is configured to communicate with the user/client 208. The building access server 202 includes a client web server access function and database ("DB") management component 210, an archive DB 212, a live database polled updates component 214, an automated polling function/expert notifiersNPN communication component 216, a parsing/communication/DB functions component 218, hardware application programming interface ("API") functions component 215, and a graphic user interface ("GUI") 220. Components 215, 216, and 218 are configured to communicate with buildings 204 and send/receive information, commands, alerts, etc. The hardware API component 215 is configured to communicate with the GUI 220, which can be configured to provide a visual display to a technician. The technician can manually respond to alerts or the system can be preset to automatically generate commands, alerts, store information, process, communicate with buildings, etc. Any information that is exchanged between the buildings 204, the building access server 202, the client side 206 and the client/user 208 can be configured to be stored in the Live Database 214. After a certain period of time, the information can be configured to be archived in the Archive DB 212. The stored information, either in Live DV 214, Archive DB 212 and/or both, can be used for analysis and generating of particular commands, advisories, alerts, triggers, etc., as well as reports that can be used in the future either by clients/users and/or third parties.

The client/user side component 206 includes an application server 222 in communication with a client/account database(s) 226, a live event notify database 224, an event notifier 228, a client-side web server 230, and a client web interface 232. The application server 222 can be configured to include various components for pre-fetching data, building communication, event handling, schedulers, components that perform analysis/reporting, and various control logic. The client/user 208 interacts with client web interface 232 that allows the client/user 208 to view information about user's buildings, respond to various alerts, issue commands, etc.

The interaction between client's side 206 and the building access server 202 takes place via client web server access functions 210 on the building access server side 202 and live event notify database 224 and client account database 226.

In some embodiments, the present invention's physical architecture can be configured to include a plurality of web/application servers hosted at a suitable co-location facility. Both web servers and primary database servers can be co-located. The ArchiveDB 212 may be a datastore leveraging the Amazon S3 data storage service or similar. In some embodiments, the design of the system ensures scalability without incurring large hardware costs. In some embodiments, the buildings do not require any additional hardware/software besides the already existing infrastructure.

In some embodiments, the present invention's system and service can be hosted on controlled servers in various co-location facilities across the country. The live service may leverage various "cloud" services (e.g., Amazon S3, Amazon EC2) to manage deployment cost and effort. Detailed choices on deployment configurations will be made taking cost, security, growth, ease and other factors into account.

In some embodiments, the communications system can be configured to include the following components: a building interface, servers and API, a website, a client user interface, and client side databases and servers (as shown in FIG. 2). The following is a brief discussion of the components of the system 200.

1. Building Interface

The present invention's building interface component interfaces directly with building controls systems via various protocols, such as LonTalk, Bacnet, ASCI protocols. As can be understood by one skilled in the art, other types of protocols are possible. A present invention's API can be configured to provide a common interface to either the LonTalk or Bacnet protocols. In some embodiments, the present invention can include routers connected to the building subsystems that can be disposed at each one of user's buildings and/or facilities, as well as a broadband interne connection (preferably dedicated). LonTalk or Bacnet compatible software and hardware can be also installed at each building and/or facility to ensure proper communication with the present invention's service.

2. Servers and API

In some embodiments, the present invention's system and service can be configured to include various servers and databases to deliver the monitoring and control functionality. These elements are:

Application Programming Interface ("API"): the API is a common interface used to connect to buildings via LonTalk, Bacnet, or any other protocol. The API can be configured to provide a core set of features of the LonTalk, Bacnet and other protocols for the purposes of monitoring and control.

Server(s): The server(s) is the computational component that polls the client building control systems to retrieve data. Additionally, data may be pushed by the client facilities to the present invention's system, depending on local system configurations and capabilities. The server(s)' primary job is to acquire building data and populate the LiveDB 214 and ArchiveDB 212.

Live Database ("Live DB") 214: The Live DB 214 is a real-time datastore for raw building data. Every sensor, event notification, alarm or other information provided by the building is captured in the LiveDB 214. The LiveDB 214 can be configured to maintain a 7-day (or any other time-period) running record of live information for each facility in the present invention's system.

Archive Database ("ArchiveDB") 212: The ArchiveDB 212 provides a historical record for raw building data. All building data older than 7 days (or any other time period) is archived in the ArchiveDB 212. This archived data is used to develop summaries, compute trends and as raw input for more sophisticated analyses, such as environmental ratings or energy management scenarios. As can be understood by one skilled in the art, there is no practical limit as to how long the archived data can be stored.

3. The Website

The present invention can be configured to include a service website for users of the present invention's system can interact with the system and their buildings. The website can be configured as a database driven web-application. This is where users/clients setup new accounts, users login and manage their facilities. The web-application can be compatible with major browsers currently available and leverage industry standard 228-bit SSL capabilities for security.

4. Client User Interface

The client user interface (UI) is how users can access the system. In some embodiments, the UI can be configured as a web application using industry standard methods and technology. Access can be configured to be browser-based for both web and mobile interfaces. In some embodiments, the users can access the system via various mobile devices, Blackberry, iPhone, iPod, iPad, personal computer, or similar browser capable devices. The client web application can provide access for account management, system set-up, system monitoring and control as well as user management. Various client-side databases and computational servers can be configured to provide account information, operational data, web access and manage computational resources.

5. Client Side Databases and Servers

The following user/client side databases and servers can be used:

Account Database (AccountDB): the AccountDB can be configured to hold client account information, billing records, user account information, and other non-technical data associated with a client account.

Client Database (ClientDB) 226: the ClientDB 226 holds processed client building data, including results of processed raw data, from the LiveDB 214 or ArchiveDB 212. The ClientDB 226 stores processed data on demand and gets raw data from the ArchiveDB 212 or LiveDB 214 to produce simple or sophisticated analyses of client building data. These can include alarms, triggers, event notifications, commands, etc. as well as generation of formatted historical reports, trend analyses, "green rating" reports, and any other reports and/or analysis. This ClientDB 226 allows the users to "view" when monitoring building systems as well as providing control inputs to set system parameters.

Application Server 222: the Application Server 222 is configured to manage the web application on the client side, mediate all client functions, facilitate communication with the building interface and building-side databases.

The Server 222 uses the API to communicate with the client facilities, if necessary.

Compute Server: the Compute Server is configured to provide offline and on-demand computational, automated control, and data processing. The Compute Server also leverages the API to communicate with the building interface.

Prior to using the system of the present invention, e.g., managing and/or controlling various buildings, the users/clients connect to the system and setup an account. In some embodiments, account setup can be self-service, up to the point of the initial building setup. In some embodiments, the present invention can provide for Client Administrators that are able to establish an account and schedule any onsite work necessary to properly configure their buildings. Clients can establish requested service levels, enter billing and payment information, provide data on buildings and facilities, as well as setup initial user accounts for Supervisors and or staff Clients can be issued a unique client number and Client ID. Clients' users can be required to enter a Client ID as part of their user login credentials. FIG. 2 illustrates a typical client login interface.

Figures 3, 4:
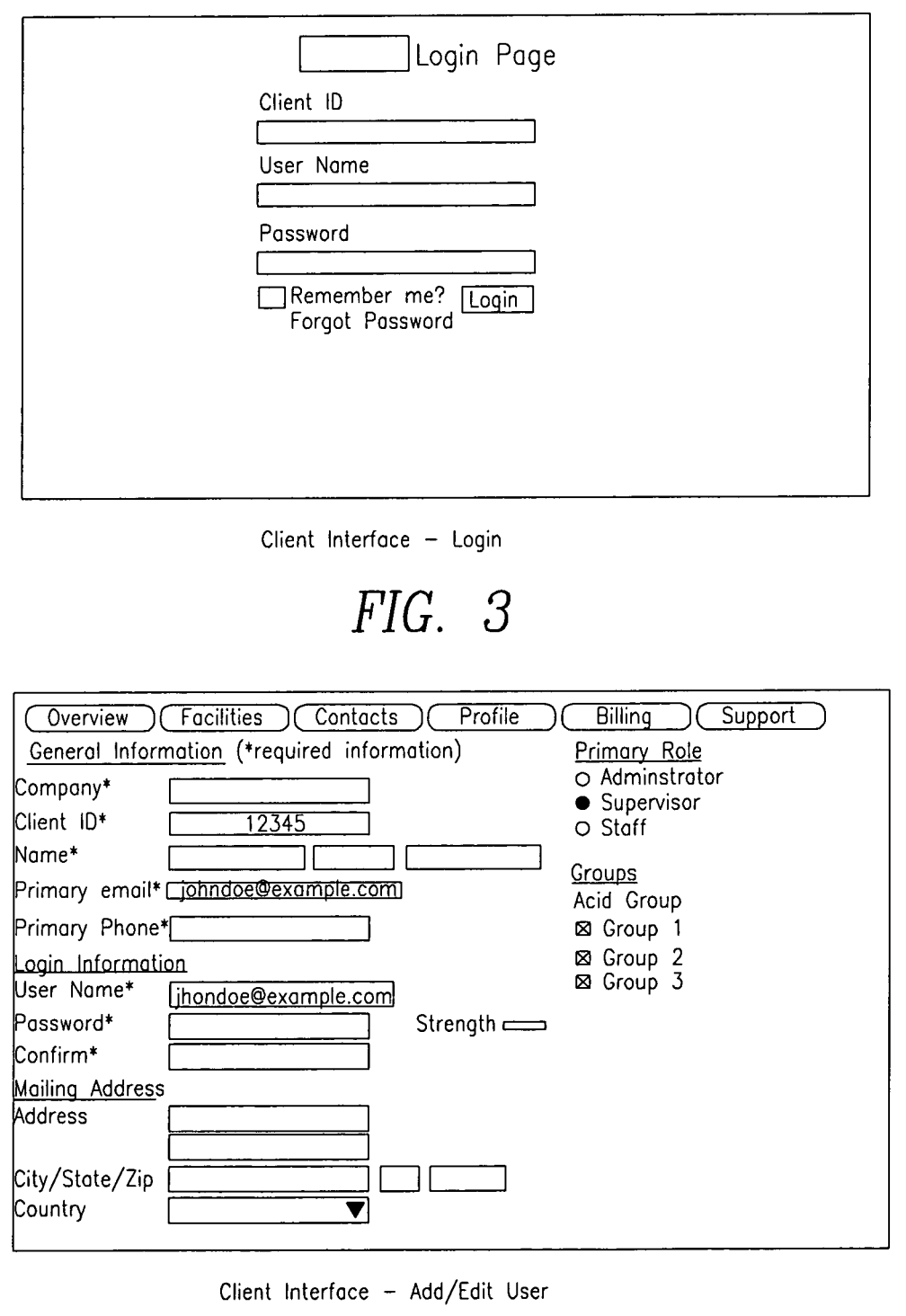

Once the client is signed in, various users can be added using add/edit client interface, as shown in FIG. 3. In some embodiments, the clients can designate various access levels to its users. There are three main types of users of the system: Administrators, Supervisors, and Staff As can be understood by one skilled in the art, there can be more than three types of users. The following is a brief description of the three types. Administrators can be the main business contact at the client. Administrator(s) is responsible for managing the contractual arrangement with the service provided by the present invention's system. Administrator(s) has a primary control to establish service levels and can change it as necessary. Anything that involves billing/payment is managed by the Administrator(s). Each Client can have at least one Administrator. Supervisor can be a technical user for the client. These persons can be senior facilities managers. They can have primary responsibility for authorizing subordinate users (Staff), setting up building system interfaces, etc. Actions that may impact service level can require Administrator approval. Supervisors may have responsibility for more than one building system. Although, Supervisors may have privileges limited to one type of building system. Supervisors have all the privileges that Staff users have. Each Building or Facility can have at least one Supervisor with global privileges for all available systems. Building Staff that handles day-to-day monitoring and control. Staff can be authorized to monitor and control various building systems. They may be authorized to add components to or upgrade/repair an existing building system. They may also add a building system to the service with Supervisor approval. Note: a specific user may be both an Administrator and Supervisor, which may be the case in smaller organizations. As can be understood by one skilled in the art, other types of users can be setup having varying levels of control and access to the client's accounts.

In some embodiments, various user groups can be created by Supervisors and/or Administrators. Upon creating of new user accounts, the accounts can be assigned to various Groups. A Group can be assigned a client-predefined set of privileges. For example, an HVAC group or lighting group may define privileges for Staff responsible for those systems. A Group may be set up for a building or cluster of buildings. Groups may be created for users needing to span multiple buildings or systems. For example, a security staff person would be in the security group, which allows them to control various security and access functions, but not control operation of the HVAC system. Supervisors are part of Groups and depending on their privileges may operate in multiple groups. Privileges can also be customized, so a member of a group may have a subset or superset of the privileges in a particular group. Groups can be configured by facility or building, system type, staffing level. For example, an office administrator may have staff privileges to only generate, view and print various reports. In addition, a specific user may have Supervisor privileges in one group, but staff privileges in another.

In some embodiments, users are authorized to take certain actions within the present invention's system depending on User type and Group membership. These policies can be primarily controlled by membership in a Group. Users can belong to one or more groups with Supervisor or Staff privileges. Within each Group a default set of privileges is applied and Supervisors may select or deselect privileges on a user-by-user basis. Different Groups can be established to define differing privilege levels. Groups may have an unlimited number of members and Users may belong to an unlimited number of groups.

In some embodiments, users can login to the present invention using a 228-bit SSL capable browser. Users will enter a ClientID, UserID (e.g., user email address), and a password. ClientID and UserID should be unique. ClientID and UserID are linked in the client account, meaning a valid UserID cannot be used to login to a Client account for which the User is not authorized. A password, for example, can be minimum 8 characters, case-sensitive, with symbols and numbers allowed to provide additional security.

In some embodiments, users can self-manage their account profiles, making changes to passwords, email address, other profile information, as well as default preferences for viewing the present invention's service information, receiving system alerts, and other communication. Certain changes, such as email and password changes can be confirmed by the user. For example, the user can confirm the email address change at the new address and the old email address can be sent a notification with the option to stop the change. Password strength can be shown to client when they establish it. Suggestions to change weak passwords can be given.

As shown in FIG. 3, each page in the system's 200 Client Interface can have a top level menu that provides rapid access to some key functions. The Overview tab allows access to the Client Home page (FIGS. 4-8), the "Facilities" tab will show the Facility Management Page and any subordinate pages (FIGS. 9-11). The Contacts tab can show a list of client contacts within the present invention's service. That is, client staff, supervisors and administrators with active accounts in the Service. The Profile tab shows the user user's account information, most of which will be editable. The Billing tab shows the current status of the client account and billing/payment information. The Billing tab can be configured to be not selectable by non-Administrators. The Support tab can take users to the Support Home page, allowing them to view existing support requests, trouble tickets, or submit new support requests or trouble tickets. (See, FIG. 3)

FIG. 4 illustrates in detail an exemplary Facility Management Page of the system 200, according to some embodiments of the present invention. The Facility Management Page is where Supervisors and Staff access features necessary to configure a facility or building, manage day to day operations, set up users, add building systems, mange users & groups, generate and view reports, etc. This can be a primary page that a typical user would visit the most. Staff can also have access to a similar page within the support application.

Figure 5:
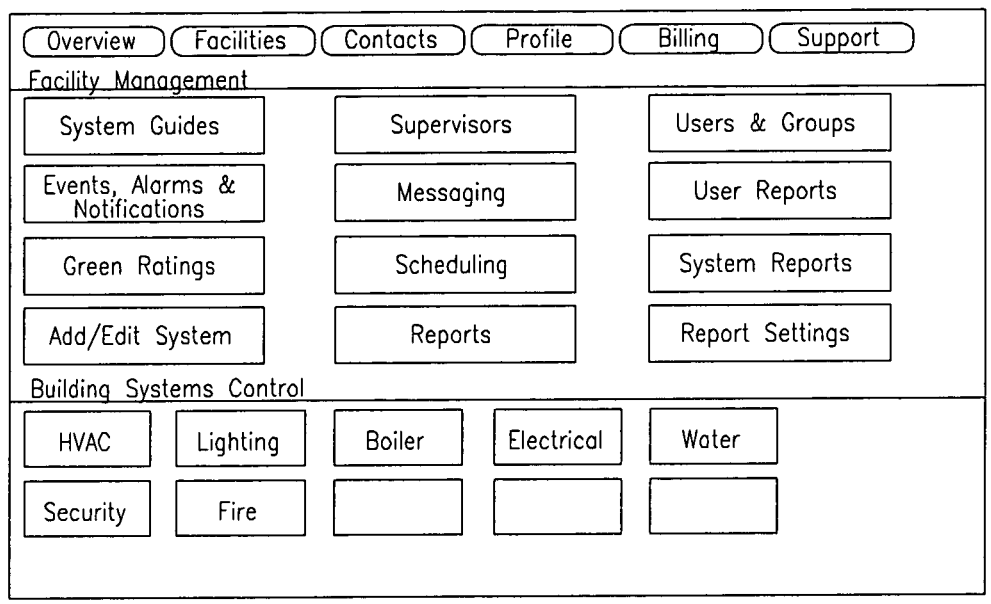
Figures 6, 7:
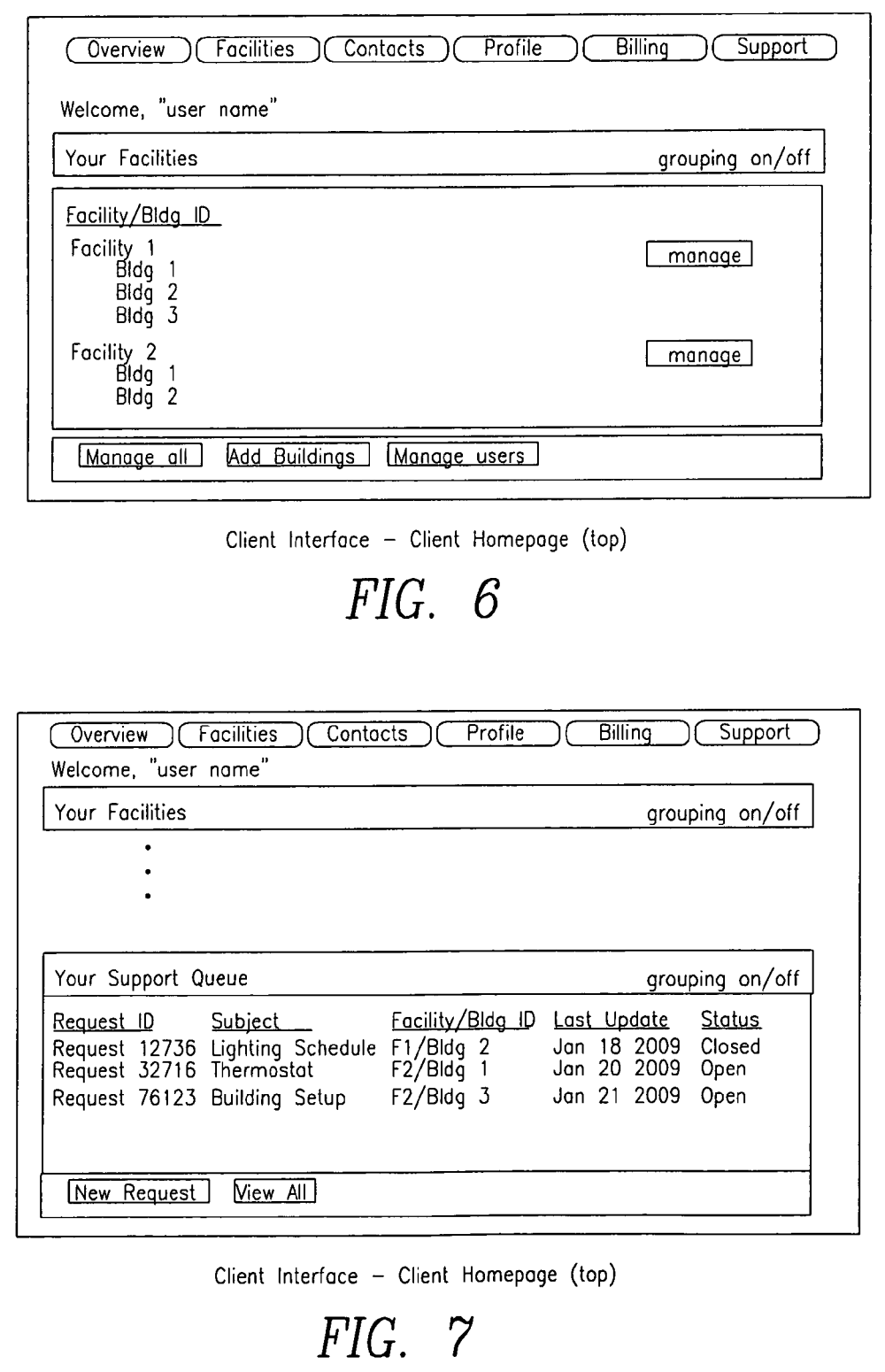

FIGS. 5-6 illustrate an exemplary Client Home Page of the system 200, according to some embodiments of the present invention. The Client Home Page can be a "landing page" for all users after they login. This presumes they have had their account setup by the initial Administrator or an existing Supervisor. The Client Home Page can have two primary sections, the top part of the page shows a listing of all facilities/buildings the user has privileges for. This list may be grouped by facility (multiple buildings) or a simple list of buildings without grouping by facility. The user would access the operational control/management feature for a given facility by clicking on the "manage" button to the right of the list, Alternatively, they can access a specific building or facility by clicking on the facility or building name. Clicking on the facility name will bring up the "Facility Management" page (as discussed below). The bottom part of the Client Home Page is a list of recent support requests. These are requests submitted by the client. Note that this will list all support requests that relate to the privileges of the current user, whether they submitted the request or not. If the request was submitted by the current user, clicking the RequestID will bring up an editable listing of the request. If the request was not submitted by the current user, they can view, but not edit the request. Again, the listed requests will be relevant to the current user. For example, if the current user has HVAC privileges, they will see all requests related to the HVAC system, but not necessarily see those related to the security system. Supervisors can see all requests.

FIG. 7 illustrates an exemplary Building View Page(s) of the system 200, according to some embodiments of the present invention. The Building View Page(s) are where users interact with their building systems. These pages are designed to provide easy access to primary information on the state of a given building system and then make changes as may be required. Multiple views for listing building data will be available, but the default view will be "by building, system, floor." What this means is the list can be ordered first by building, then by a system (e.g., HVAC, lighting, etc.), then floor, room, etc. As such, all lighting zones by floor in building 2 before those in building 2 are illustrated. Alternate views by building may group items by floor first or system. Users will eventually be able to select their own preference for viewing these lists. Information available in these views can include:

Facility/Building ID—the building and facility currently being viewed;
Control Point—the actual device, zone or process being monitored;
Value—the current value for the Control Point (on/off, open/closed, temp, etc.);
Status—the status of the Control Point (norm, alarm, transition);
Source—the source of the last command for the Control Point (web, mobile, local, logic, Alarm);
Alarm & Event Status—whether or not the Control Point is in an Alarm state.

In some embodiments, the present invention's software infrastructure can be responsible for direct communication with building hardware and can be based on the BACnet or any other web services standard. In alternate embodiments, a LONtalk based router/building or any other type of protocol can also be supported. The following description, for illustration purposes only, will refer to BACnet protocol standard. This standard defines the low-level database storage techniques and layout defined later (i.e. storage blocks, types, functions, access requirements, etc.). The first section below describes the API functions that operate on the Servers. These Servers are responsible for setting up communication with building routers and devices, as well as managing the real-time polling data updates to the database. In some embodiments, a "Data Collection" functionality can be used on existing remote Building Automation Servers. Both BACnet and LONTalk standards define a "Communication Stack" that enables logging of temporal data. Having local existing BACnet and LONtalk servers store "Time Blocks" of this data will reduce the transactions necessary on the Servers, thus increasing performance and scalability. Specific examples of the API calls are shown in Appendix.

In some embodiments, the software block HW (hardware) Polling 216 can be responsible for automated building communication and polling for device data. Each device node can have a specific polling frequency (e.g., temperature gauges every 20 seconds, boiler temperature every 5 seconds, fan speeds every second, etc.). These sampled data may be logged on customer building server and streamed every 5 minutes when a client isn't logged in interactively (present invention's server can be initiated). HW Polling can also control all event/notification functionality. The "listener" functions can filter all "Events" from assigned building devices and initiate communication notification (e-mail, IM, phone, cell text messaging, etc.) to registered recipients. The events can be given a priority level 2 being the highest priority. Examples include: Priority 3: Boiler Maintenance Testing, Fuel burn rate above nominal, etc; Priority 2: Temperature below lowest set point by threshold margin, Door open longer than time-out period, etc; Priority 2: Fuel gauge empty, Water sensor triggered, General alarms; etc.). All database updates are carried out by this block using the stored schedules for all customer assets. Extensive logs can be created by this block to record all transactions with routers, building devices, etc.

The client side 206 can be configured to include a Client Web Server Listener. This software block can be responsible for initiating the pre-fetch processes. When a client logs in, this block automatically starts streaming required DB data according to access privileges. It is continually updated with live polling data only while a client is actively logged in. Alarm notifications bypass this block and use their own live server function with appropriate "Notify Lists".

The Parsing-Communication Functions 218 can directly control transactions with building hardware. Usually encrypted, there are two or three blocks that control translation and packet writing/parsing for the BACnet Web Services protocol, LONtalk protocol and an Other block that will support custom functions for high profile clients without one of the aforementioned standards. In conjunction with the Poller block, all DB write/search functions are included here.

The Hardware API component 215 can be configured to provide a direct function access used for all Web GUI services. They are served to both the Personnel Setup GUI 220 as data entry is processed and settings configured. They enable test connections with building routers and preview of the hardware/system/node hierarchy during the selection of managed components. In anticipation of possible revenue models, monthly service fees may be based on the number and type of systems/sensors being managed, and billing support can and should be built into or connected with this interface where hardware is selected for access based on quotas or analogous limits.

In some embodiments, set-up and support GUI 220 can be web based. This serves to broaden the access to the present invention's systems by personnel in remote locations without the need for installation software and dedicated local IT support. All browser-based data communication will use industry standard of security features. The Set-up GUI 220 allows establishing initial client accounts. This could include billing information, initial administrator passwords, contacts, building information, building specific data such as router IP addresses, port numbers, building locations, etc. The personnel would establish/initialize communication with the site hardware to verify what is accessible and what may need onsite authorization by the client's personnel. Note that some of this information (contact info, etc.) may be provided by the Client through the initial online sign-up page. At this point, however, setting up an account and configuring a building for monitoring may require personnel, and possibly on-site contractors to ensure the target building is properly configured. All client hardware, devices, sensors, etc. would be catalogued with their unique identifiers and built into a database with defined parameters for monitoring and control (e.g., polling frequencies, backup procedures, priority notification list, etc.). In some embodiments, all priority 2 messages can be passed to the live prefetch DB server, where the client administrator has already set-up the notification list for each "Priority Event". Notification could be via email, IM addresses, text messages, voice mail/phone, etc. Portions of this set-up/support UI screen could be made available to the client administrator for certain self-service tasks, but access to API functions that initiate the DB set-up and polling communication should reside exclusively with technicians. Note that after initial set-up Clients will have the ability to adjust various monitoring parameters (polling rates, backups, notifications, etc.) through the client web application. The range of client adjustment may be limited to ensure system operations don't fall outside various ranges. Since buildings may not support a turn-key installation and ongoing support may require staff access to building details the Support web application includes a Facilities Management page as mentioned above. To access a specific facility, staff may bring up a Facilities Setup/modify page (FIG. 8). This page allows the support staff to access the onsite building servers and routers to establish/ensure proper communication and perform initial configuration of a Client site. FIGS. 9-11 illustrate a selection page for accessing a specific Node (sensor or control unit within a building), the UI to modify or configure a selected Node.

Figure 13:
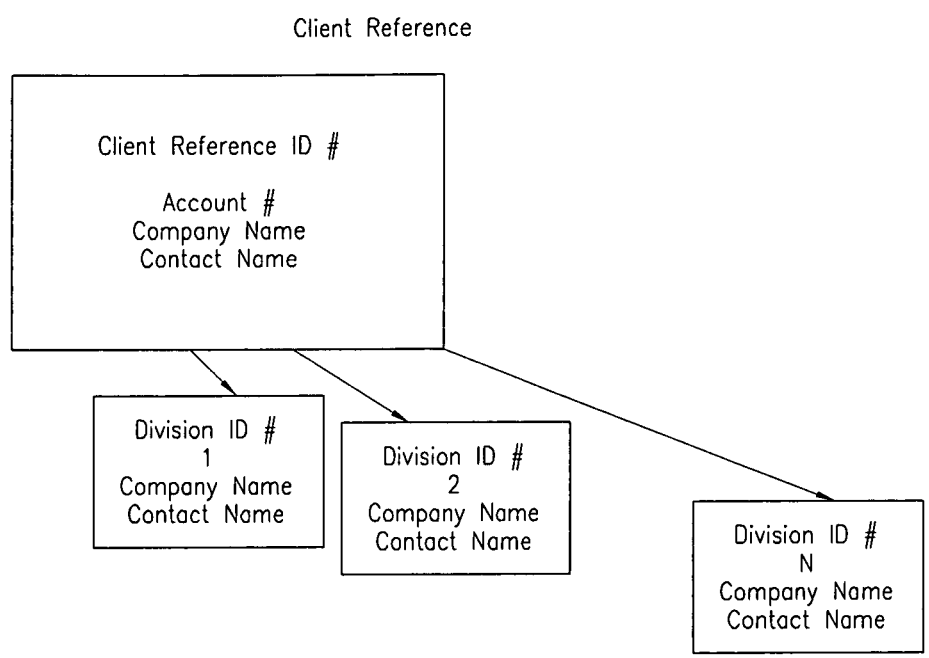
Figure 14:
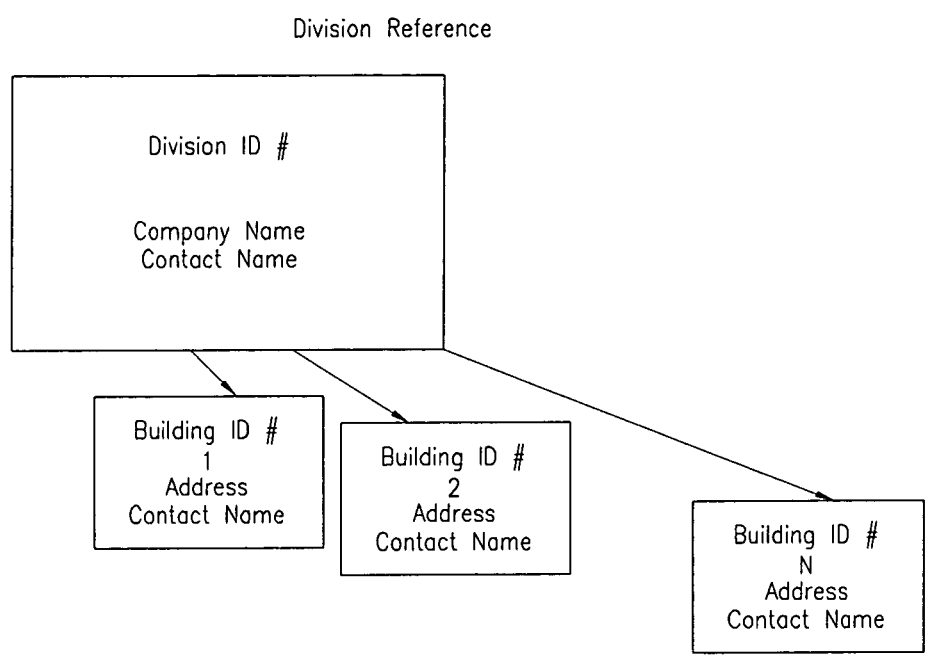
Figure 15:
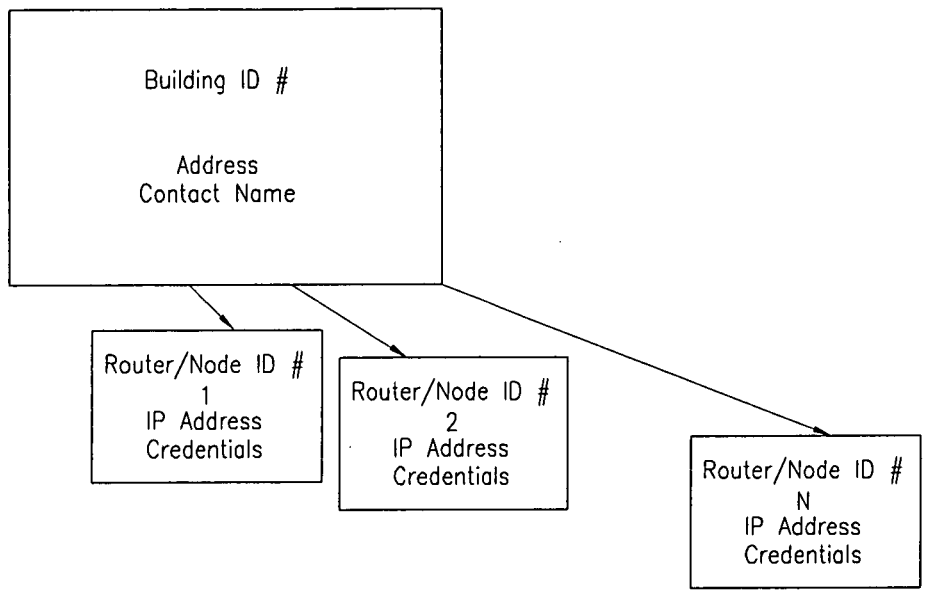
Figure 16:
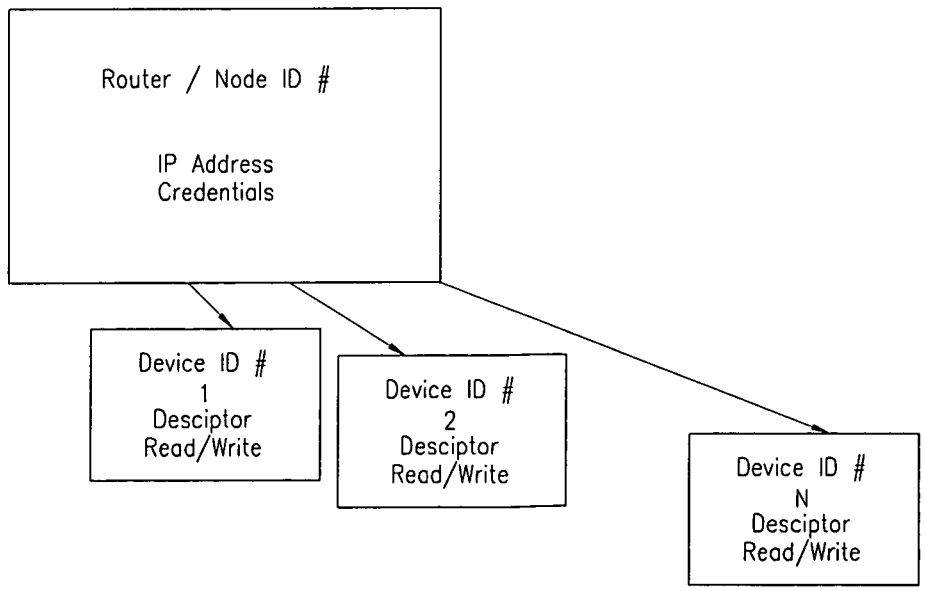
Figure 17:
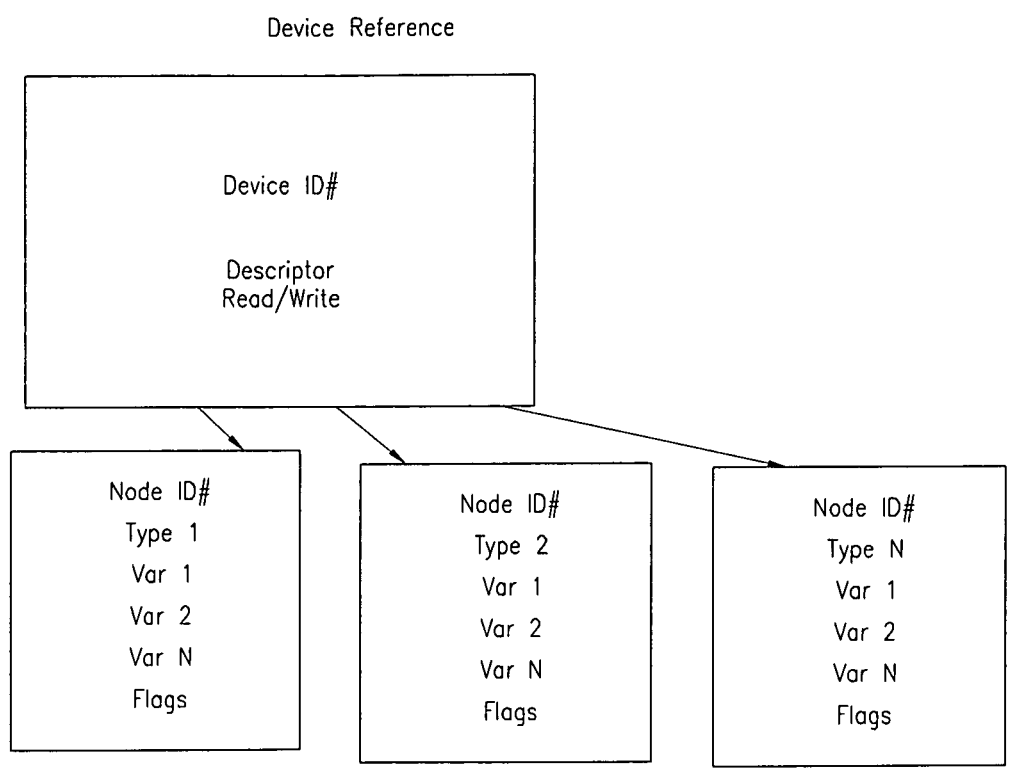

FIGS. 12-17 illustrate various reference hierarchies pertaining to particular Client IDs with regard to system 200 shown in FIG. 2. FIGS. 12 and 13 illustrate a client and unit data reference. FIGS. 14-17 illustrate facility and node (equipment) data references. These schematics illustrate support of large and small client configurations, as well as simplification of auditing, reporting and data analysis operations. The system can be configured to aggregate data on a per client basis, per system basis or across virtually any set of parameters. The goal here is to facilitate global and, if necessary, anonymous data analysis that might be required to produce regional or other large scale analyses (e.g. "Green Rating" for a city).

The following discussion relates to various embodiments implementing the systems and methods described above and in connection with FIGS. 1-40.

In some embodiments, the present invention relates to monitoring and recording temperatures of individual refrigeration units that can be disposed in a building (e.g., a kitchen in a restaurant; a medical facility that includes a refrigeration unit that stores medications, medical supplies, or any other items, or any other facility). The present invention can be configured to determine malfunction and/or temperature variation below designated levels (i.e., a predetermined threshold temperature level) and provide immediate notification to a central control unit and/or assigned personnel so that a corrective action can be taken. The notification can be received on an iPod, iPhone, blackberry, cellular telephone, PC, or any other suitable device. Such monitoring allows for storage of food items at a proper temperature as well as keeping the food items within safe temperature ranges to avoid food borne illnesses. In case of medical storage facilities, medications/vaccines or other items are stored and kept at predefined temperatures in order to maintain their effectiveness and chemical integrity, as required by various regulations. In case of laboratory settings, various specimens may need to be stored in separate refrigerators and maintained at a defined level to maintain the integrity of the specimen until transport.

In some embodiments, the present invention can be configured to be disposed in a hospital, nursing home, or any other facilities that may require patient monitoring. Such monitoring can be done remotely. The present invention is configured to monitor and relay alarm data to a central device(s) and/or a handheld device (e.g., iPod, iPhone, blackberry, cellular telephone, PC, or any other suitable device) given to various care professionals and/or staff for immediate detection and swifter reaction time. In some embodiments, the present invention can be configured to monitor fall/safety management alarm devices, such as, including but not limited to, bed pad alarms, chair pad alarms, infrared motion sensor alarms, seat belt alarms, under seat pad alarms, or any other devices that can be configured to monitor. Such monitoring can be configured to ensure faster reaction time by staff that is responsible for monitoring these alarms and hence, may prevent fall and/or injury by the patient that has such alarms assigned to the room.

In some embodiments, the present invention can be configured to relay building/unit alarm data to a central device(s) handheld (e.g., iPod, iPhone, blackberry, cellular telephone, PC, or any other monitoring device) by assigned nursing/maintenance/corporate staff for immediate detection and swift reaction time of security/safety breeches by wandering residents or unauthorized personnel. The present invention can be configured to monitor door alarm sensors that can be configured to be disposed on various secured sections of the building (e.g., restricted entry/exit doors) and provide appropriate notification to handheld devices to alert staff that is responsible for maintaining security in the facility. In some embodiments, the present invention can be configured to monitor and provide information about: delays in locking doors that can be opened for a limited amount of time and at other times should remain locked; doors with lock bypass options; exit alarms (e.g., when a resident or a patient attempts to leave the building by himself/herself and who may not be allowed to do so unattended). This feature of the present invention can be configured to limit theft, observe and react to any non-witnessed events (i.e., those events that are not actively being observed by responsible personnel) occurring in both public and private unit areas, (e.g., day rooms, bath rooms, bed rooms, behind privacy curtains, in hallways, unattended service areas, etc.).

In some embodiments, the present invention can be configured to monitor and relay building/unit alarm data from the hot water mixing values and anti-scald system to a central device's handheld (iPod, iPhone, iPad, blackberry, cellular telephone, PC, or any other monitoring device) by both onsite and off-site assigned nursing/maintenance/corporate staff for immediate detection and swift response time of plumbing hot water temperature malfunctions. Immediate scalding (above 110 degrees Celsius) could occur at resident sinks, tub/shower areas, whirlpools, etc. and toxic bacteria like Legionella can grow if temperatures are too cool, (149 degrees Celsius). Anti-scalding system alarms may go undetected or delayed if not located in an accessible area or relayed to staff that are unfamiliar with how to immediately identify and eliminate immediate harm. The present invention can be configured to monitor various devices that detect mixing values and warming system alarms and can be further configured to immediately notify key personnel when corrective actions needs to be taken and the location of the malfunction. In some embodiments, the present invention is configured to monitor alerts when the stored hot water falls below the ideal range of 150-160 degrees Celsius and when mixing value failures occur resulting in the residents' hot water mixture being greater than 110 degrees Celsius. Also, in some embodiments, the present invention can be configured to monitor devices that generate an alarm when hot water temperature valves malfunction or fails to maintain required temperatures for dishwashing and laundry cycles. In this scenario, various resident and building supervisory staffs can call to direct or receive feedback on staff's immediate interventions and resolutions. In some embodiments, the present invention can be configured to monitor and measure values of hot water mixing valves on the water tank; alarm(s) on the anti-scald system if any; point-of-use thermostatic mixing valves. Such monitoring allows for faster reaction time to the alarms generated by the system in order to prevent resident injuries from non-human created scalding and detect malfunctions with its exact location as well as tracking and documentation of temperature monitoring and verification.

In some embodiments, the present invention can be configured to monitor and relay resident call bell/light service alarms to a central device(s) handheld (iPod, iPhone, iPad, blackberry, cellular telephone, PC, or any other monitoring device) by assigned nursing staff for immediate detection and swifter response time in a hospital, nursing home, or any other medical or non-medical facility. Upon receiving the alarm information, the appropriate responsible staff (e.g., nurse, attendant, etc.) can see immediately which resident/patient is requesting service from any location on the unit. The staff can communicate with the resident and direct an appropriate staff member to assist the resident. Administrators can determine the timeframe from request onset to task completion for monitoring any individual or an entire shifts' timely task performance. In some embodiments, the present invention can also be configured to monitor time required for a staff member to respond to resident/patient's request; time spent by the staff member with the patient as a result of the request; and/or any other pertinent information. Such information may be useful in tracking and monitoring of service time to address resident/family complaints related to delayed call bell response times as well as allowing managerial staff to monitor their subordinates without making lengthy visual observations.

In some embodiments, the present invention can be configured to monitor and relay information to individual caregivers in a hospital, nursing home, or any other facility and to provide an alarm beacon when a patient is wet/saturated and needs to be changed. Currently, aide staff must physically examine incontinent garments (diapers, briefs, pads, etc.) to determine if the item requires changing. In some cases, the standard of practice dictates that this task is to be performed at a minimum every two hours. For mechanical lift residents, this can be time consuming and labor intensive to discover the diaper was not wet and did not need changing. An alarm beacon would sound when the diaper is wet, thus, eliminating the need for this frequent and sometimes unnecessary check to be performed. Hence, the present invention can be configured to monitor alarm devices that are installed in disposable diapers, briefs, or pads that must be checked for change purposes routinely as well as blue chuk pads that are used to catch fluids or prevent moisture from resting on skin surfaces or soiling bed/furniture/wheelchair cushions.

In some embodiments, the present invention can be configured to monitor and relay information to a central device(s) handheld (iPod, iPhone, iPad, blackberry, cellular telephone, PC, or any other monitoring device) by assigned nursing staff that pumps (i.e., enteral or intravenous) that were set for administration have "stopped". Tracking the start/end times of feeding and medication administration verifies compliance that the items were provided. Notification of a "stopped" pump alerts a nurse who may be down another hallway or room that the procedure is completed for her attention. An unscheduled "stopped" pump alerts the nurse to a possible malfunction or resident tampering issue. As such, the present invention can be configured to monitor enteral pumps, IV pumps, or any other devices. By monitoring such device, the present invention allows nursing staff to be immediately alerted to a completed feeding or IV medication administration so pump detachment and required line management (flushes, etc.) can be provided.

In some embodiments, the present invention can be configured to monitor and relay information to a central device(s) handheld (iPod, iPhone, iPad, blackberry, cellular telephone, PC, or any other monitoring device) assigned to staff about all employee movement within the facility. Supervisory staff can immediately track when employees arrive and leave the resident units. In some embodiments, personnel oversight is minimized when supervisors can track and alert them to tardy employees who arrive on the resident unit late although they have "punched-in" at the time clock timely or leave significantly sooner than "clocked-out" time. Supervisory staff can also track "break" times are taken as directed and meal breaks do not exceed the scheduled timeframes. In some embodiments, the present invention can be configured to monitor arrival and departure times of staff at change of shifts; arrival and departure times of staff at break and meal times; arrival and departure times of staff for any reason; or any other times.

In some embodiments, the present invention relates to a computer program product stored on a computer-readable medium, for use with a computer configured to monitor and control a building/facility, the computer program product including computer-readable instructions for causing the computer to execute monitoring and control of a building/facility.

Example embodiments of the methods, circuits, and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed:

1. A system for controlling and monitoring a plurality of different types of systems within a building, comprising:
    a building component including a plurality of control points configured to be disposed within a building and to monitor and control a plurality of elements of the plurality of different types of systems within the building;
    a network component configured to be communicatively coupled to said building component and configured to process information received from said plurality of control points; and
    a remote client component configured to be communicatively coupled to said network component and configured to provide monitoring and control of the building via said network component and said building component;
    wherein said remote client component is configured to receive processed data from said network component and generate a plurality of instructions to said plurality of control points via said network component, said received processed data is indicative of an operation of each element in the plurality of elements of the plurality of different types of systems and an operation of each system in the plurality of different types of systems, wherein each instruction in said plurality of instructions for controlling at least one element in the plurality of elements is generated based on a combination of said received processed data and is dependent on at least one instruction to and said received processed data indicative of an operation of at least another element in the plurality of elements.

2. The system according to claim 1, wherein said building component is configured to monitor and control a plurality of systems within a plurality of buildings.

3. The system according to claim 1, wherein the systems are characterized by the plurality of control points configured to communicate data concerning operation of the plurality of control points to said remote client component;
    wherein said network component is configured to monitor and control operation of the plurality of control points based on the communicated data and based on instructions received from said remote client component.

4. The system according to claim 1, wherein said network component is configured to include an application server configured to receive and process data from said building component and to provide said processed data to said remote client component.

5. The system according to claim 1, wherein a user manually monitors and controls operation of the system within the building via said network component and said building component.

6. The system according to claim 1, wherein data generated by the network component is configured to be stored in a first database.

7. The system according to claim 6, wherein after a predetermined period of time, the data stored in the first database is transferred to a second database.

8. The system according to claim 7, wherein data stored in the first and second databases is used to generate at least one report.

9. A method for controlling and monitoring a plurality of different types of systems within a building using a communications system having
    a building component configured to include a plurality of control points configured to be disposed within a building and to monitor and control a plurality of elements of the plurality of different types of systems within the building;
    a network component configured to be communicatively coupled to said building component and configured to process information received from said plurality of control points; and
    a remote client component configured to be communicatively coupled to said network component and configured to provide monitoring and control of the building via said network component and said building component;

wherein said remote client component is configured to receive processed data from said network component and generate a plurality of instructions to said plurality of control points via said network component, said received processed data is indicative of an operation of each element in the plurality of elements of the plurality of different types of systems and an operation of each system in the plurality of different types of systems, wherein each instruction in said plurality of instructions for controlling at least one element in the plurality of elements is generated based on a combination of said received processed data and is dependent on at least one instruction to and said received processed data indicative of an operation of at least another element in the plurality of elements, the method comprising:

establishing communication between the plurality of systems within the building and the network component;

establishing communication between the network component and the remote client component;

receiving information from the user concerning operation of the plurality of systems within the building; and using the network component and the building component, monitoring and controlling operation of the plurality of systems within the building based on the received information.

10. The method according to claim 9, wherein said building component is configured to monitor and control a plurality of systems within a plurality of building.

11. The method according to claim 9, wherein the plurality of systems are characterized by the plurality of control points configured to communicate data concerning operation of the plurality of control points to said remote client component;

wherein said network component is configured to monitor and control operation of the plurality of control points based on the communicated data based on instructions received from said remote client component.

12. The method according to claim 9, wherein said network component is configured to include an application server configured to receive and process data from said building component and to provide said processed data to said remote client component.

13. The method according to claim 9, wherein the user manually monitors and controls operation of the plurality of systems within the building via said network component and said building component.

14. The method according to claim 9, wherein data generated by the network component is configured to be stored in a first database.

15. The method according to claim 14, wherein after a predetermined period of time, the data stored in the first database is transferred to a second database.

16. The method according to claim 15, wherein data stored in the first and second databases is used to generate at least one report.

17. A computer program product stored on a computer-readable medium, for use with a computer configured to monitor and control a plurality of different types of systems within a building using a communications system having a building component configured to include a plurality of control points configured to be disposed within a building and to monitor and control a plurality of elements of the plurality of different types of systems within the building;

a network component configured to be communicatively coupled to said building component and configured to process information received from said plurality of control points; and a remote client component configured to be communicatively coupled to said network component and configured to provide monitoring and control of the building via said network component and said building component;

wherein said remote client component is configured to receive processed data from said network component and generate a plurality of instructions to said plurality of control points via said network component, said received processed data is indicative of an operation of each element in the plurality of elements of the plurality of different types of systems and an operation of each system in the plurality of different types of systems, wherein each instruction in said plurality of instructions for controlling at least one element in the plurality of elements is generated based on a combination of said received processed data and is dependent on at least one instruction to and said received processed data indicative of an operation of at least another element in the plurality of elements, the computer program product comprising computer-readable instructions for causing the computer to:

establish communication between the plurality of systems within the building and the network component;

establish communication between the network component and the remote client component;

receive information from a user concerning operation of the system within the building;

using the network component and the building component, monitor and control operation of the plurality of systems within the facility based on the received information.

* * * * *